(12) United States Patent
Johansson et al.

(10) Patent No.: US 10,687,308 B2
(45) Date of Patent: *Jun. 16, 2020

(54) CORE NETWORK NODE AND METHODS FOR DETERMINING REACHABILITY OF WIRELESS DEVICES IN EXTENDED DISCONTINUOUS RECEIVE (EDRX) OPERATION

(71) Applicant: TELEFONAKTIEBOLAGET LM ERICSSON (PUBL), Stockholm (SE)

(72) Inventors: Nicklas Johansson, Brokind (SE); John Walter Diachina, Garner, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 195 days.

This patent is subject to a terminal disclaimer.

(21) Appl. No.: 15/468,353

(22) Filed: Mar. 24, 2017

(65) Prior Publication Data

US 2017/0280419 A1    Sep. 28, 2017

Related U.S. Application Data

(60) Provisional application No. 62/313,057, filed on Mar. 24, 2016.

(51) Int. Cl.
| | | |
|---|---|---|
| H04W 68/04 | (2009.01) |
| H04W 52/02 | (2009.01) |
| H04W 68/02 | (2009.01) |
| H04W 76/28 | (2018.01) |
| H04W 4/70 | (2018.01) |
| H04W 84/04 | (2009.01) |
| H04W 88/14 | (2009.01) |
| H04W 92/14 | (2009.01) |

(52) U.S. Cl.
CPC ....... *H04W 68/04* (2013.01); *H04W 52/0216* (2013.01); *H04W 68/02* (2013.01); *H04W 76/28* (2018.02); *H04W 4/70* (2018.02); *H04W 84/042* (2013.01); *H04W 88/14* (2013.01); *H04W 92/14* (2013.01); *Y02D 70/1224* (2018.01); *Y02D 70/1226* (2018.01); *Y02D 70/1262* (2018.01); *Y02D 70/146* (2018.01); *Y02D 70/164* (2018.01); *Y02D 70/21* (2018.01); *Y02D 70/24* (2018.01)

(58) Field of Classification Search
CPC .................................................. H04W 68/04
USPC ....................................................... 370/328
See application file for complete search history.

(56) References Cited

U.S. PATENT DOCUMENTS

| | | |
|---|---|---|
| 2005/0002407 A1 | 1/2005 | Shaheen et al. |
| 2006/0262742 A1 | 11/2006 | Dommaraju et al. |
| 2010/0130237 A1 | 5/2010 | Kitazoe et al. |
| 2010/0150114 A1 | 6/2010 | Che |

(Continued)

OTHER PUBLICATIONS (3GPP TSG GERAN#64; San Francisco, USA ; Nov., 17-21, 2014; GP-140897; Source: Ericsson . . . ) (Year: 2014).*

(Continued)

*Primary Examiner* — Kodzovi Acolatse
*Assistant Examiner* — Abdeltif Ajid

(57) ABSTRACT

A core network node (e.g., Serving GPRS Support Node (SGSN)) and various methods are described herein for determining reachability of wireless devices operating with extended discontinuous reception (eDRX).

14 Claims, 5 Drawing Sheets

(56) References Cited

U.S. PATENT DOCUMENTS

| | | |
|---|---|---|
| 2013/0301501 A1 | 11/2013 | Olvera-Hernandez et al. |
| 2014/0016614 A1 | 1/2014 | Velev et al. |
| 2014/0341140 A1 | 11/2014 | Beale |
| 2016/0081022 A1 | 3/2016 | Haneji et al. |
| 2016/0135124 A1 | 5/2016 | Vos et al. |
| 2016/0286385 A1 | 9/2016 | Ryu et al. |
| 2016/0295504 A1* | 10/2016 | Wang .................... H04W 52/02 |
| 2016/0330791 A1 | 11/2016 | Vajapeyam et al. |
| 2017/0367044 A1 | 12/2017 | Fujishiro et al. |
| 2018/0324750 A1 | 11/2018 | Byun et al. |

OTHER PUBLICATIONS

Ericsson LM, "Time Coordinated Cells for eDRX", 3GPP TSG GERAN #66, Tdoc GP-150426; Agenda item 7.1.5.3.4, 7.1.5.3.5, 7.2.5.3.3, 7.2.5.3.4; Vilnius, Lithuania; May 25-29, 2015; 4 pages.

Ericsson LM, "pCR TR 45.820—EC-GSM, Time Coordinated Cells for eDRX", 3GPP TSG GERAN#66, Tdoc GP-150427; Agenda item 7.1.5.3.5, 7.2.5.3.4; Vilnius, Lithuania, May 25-29, 2015; 3 pages.

Ericsson LM, "pCR TR 43.869—uPoD—Time Coordinated Cells for eDRX", 3GPP TSG GERAN#66, Tdoc GP-150428; Agenda item 7.1.5.3.4, 7.2.5.3.3; Vilnius, Lithuania; May 25-29, 2015; 3 pages.

3GPP TS 36.331 V12.5.0 (Mar. 2015), 3rd Generation Partnership Project; Technical Specification Group Radio Access Network; Evolved Universal Terrestrial Radio Access (E-UTRA); Radio Resource Control (RRC); Protocol specification (Release 12), available Mar. 27, 2015, 445 pages.

3GPP TS 45.002 V12.4.0 (Mar. 2015), 3rd Generation Partnership Project; Technical Specification Group GSM/EDGE Radio Access Network; Multiplexing and multiple access on the radio path (Release 12), available Mar. 21, 2015, 119 pages.

3GPP TS 25.304 V12.5.0 (Mar. 2015), 3rd Generation Partnership Project; Technical Specification Group Radio Access Network; User Equipment (UE) procedures in idle mode and procedures for cell reselection in connected mode (Release 12), available Mar. 23, 2015, 58 pages.

Ericsson, "EC-GSM—Paging Group Determination", 3GPP TSG GERAN #65, Tdoc GP-150133, Agenda item 7.1.5.3.5, 7.2.5.3.4; Shanghai, China; Mar. 9-13, 2015; 4 pages.

Ericsson LM, "Pseudo CR 45.820—EC-GSM, Paging Group Determination", 3GPP TSG GERAN#65, GP-150259, Agenda item 7.1.5.3.5, 7.2.5.3.4; Shanghai, P.R. China; Mar. 9-13, 2015; 3 pages.

3GPP TS 45.010 V12.0.0 (Sep. 2014), 3rd Generation Partnership Project; Technical Specification Group GSM/EDGE Radio Access Network; Radio subsystem synchronization (Release 12), upload date Sep. 26, 2014, 32 pages.

3GPP TS 48.018 V12.4.0 (Nov. 2014), 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 12), upload date Dec. 18, 2014, 191 pages.

3GPP TR 23.770 V0.2.0 (Apr. 2015), 3rd Generation Partnership Project; Technical Specification Group Services and System Aspects; Study on System Impacts of Extended DRX Cycle for Power Consumption Optimization; (Release 13), upload date May 5, 2015, 33 pages.

Intel Corporation: "Impacts of Unsynchronized Cells in a Routing Area on Paging with eDRX", 3GPP TSG GERAN Meeting #66, GP-150404, Vilnius, Lithuania, May 25-29, 2015, 9 pages.

Ericsson LM, "Pseudo CR 45.820 Synchronized Cells for eDRX", 3GPP DRAFT; GPC150264, 3GPP TSG GERAN Fs_IoT_LC Adhoc#2, Sophia Antipolis, Apr. 20-23, 2015, 2 pages.

3GPP TS 48.018 V13.0.0 (Dec. 2015), 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP)(Release 13), upload date Dec. 21, 2015, pp. 199.

3GPP TS 45.010 V13.0.0 (Nov. 2015), 3rd Generation Partnership Project; Technical Specification Group GSM/EDGE Radio Access Network; Radio subsystem synchronization (Release 13), upload date Dec. 18, 2015, pp. 33.

3GPP TS 45.002 V13.2.0 (May 2016), 3rd Generation Partnership Project; Technical Specification Group GSM/EDGE Radio Access Network; Multiplexing and multiple access on the radio path (Release 13), upload date Jun. 21, 2016, pp. 139.

Ericsson LM, "New Work Item on Extended Coverage GSM (EC-GSM) for support of Cellular Internet of Things3GPP TS 45.002 V.13.2.0 (Jun. 2016)", GP-151039 (Revision of GP-150994), 3GPP TSG GERAN#67, Yinchuan, P.R. China, Aug. 10-14, 2015, 6 pages.

Ericsson: "GSM Evolution for cellular IoT—PCH Overview". 3GPP TSG Geran#63. Tdoc GP-140605. Ljubljana, Slovenia. Aug. 25-29, 2014, the whole document.

Ericsson: "pCR for uPoD eDRX". 3GPP TSG Geran#64. Tdoc GP-140897. San Francisco, USA. Nov. 17-21, 2014, the whole document.

Ericsson: "MS Energy Consumption Evaluation, PSM vs. eDRX". 3GPP TSG Geran#64. Tdoc GP-140910. San Francisco, USA. Nov. 17-21, 2014, the whole document.

3GPP TR 23.709 V0.2.0 (Nov. 2014), 3rd Generation Partnership Project; Technical Specification Group Services and System Aspects; Study on Optimizations to Support High Latency Communications; Stage 2 (Release 13), red-marked version, available Dec. 4, 2014, paragraph [04.1], paragraph [05.2].

Qualcomm Incorporated: "Solution for Buffering downlink data in S-GW for UEs not immediately reachable", SA WG2 Temporary Document, SA WG2 Meeting #S2-106, S2-144170, (revision of S2-14xxxx), Nov. 17-21, 2014, San Francisco, USA, the whole document.

Alcatel-Lucent et al: "HLCOM Solution based on DL buffering in SGW", SA WG2 Temporary Document, SA WG2 Meeting #106, S2-144597, (revision of S2-144385 ), Nov. 17-21, 2014, San Francisco, California, USA, the whole document.

Alcatel-Lucent et al.: "HLCOM Solution based on DL buffering in SGW", 3GPP draft; SA WG2 Meeting #106, S2-144385, merge of S2-144112, S2-143939 & S2-144170, Nov. 17-21, 2014, San Francisco, California, USA, the whole document.

* cited by examiner

CORE NETWORK NODE AND METHODS FOR DETERMINING REACHABILITY OF WIRELESS DEVICES IN EXTENDED DISCONTINUOUS RECEIVE (EDRX) OPERATION

CLAIM OF PRIORITY

This application claims the benefit of priority to U.S. Provisional Application Ser. No. 62/313,057, filed on Mar. 24, 2016, the entire contents of which are hereby incorporated by reference herein for all purposes.

RELATED PATENT APPLICATIONS

This application is related to the following co-assigned applications: (1) U.S. application Ser. No. 15/154,708, filed on May 13, 2016, and entitled "Core Network Node and Method—Time Coordinated Cells for Extended Discontinuous Receive (eDRX)"; (2) U.S. application Ser. No. 15/154,724, filed on May 13, 2016, and entitled "Radio Access Network Node and Method—Time Coordinated Cells for Extended Discontinuous Receive (eDRX)"; and (3) co-filed U.S. application Ser. No. 15/468,337, filed on Mar. 24, 2017, and entitled "Core Network Node and Methods for Determining Reachability of Wireless Devices in Extended Discontinuous Receive (eDRX) Operation". The entire contents of each of these documents are hereby incorporated by reference herein for all purposes.

TECHNICAL FIELD

The present disclosure relates generally to the wireless communications field and, more particularly, to a core network node (e.g., Serving GPRS Support Node (SGSN)) and various methods for determining reachability of wireless devices operating with extended discontinuous reception (eDRX).

BACKGROUND

The following abbreviations and terms are herewith defined, at least some of which are referred to within the following description of the present disclosure.
3GPP 3rd-Generation Partnership Project
AGCH Access Grant Channel
ASIC Application Specific Integrated Circuit
BLER Block Error Rate
BSS Base Station Subsystem
CC Coverage Class
CN Core Network
DRX Discontinuous Receive Cycle
EC-GSM Extended Coverage Global System for Mobile Communications
EC-PCH Extended Coverage Paging Channel
eDRX Extended Discontinuous Receive
eNB Evolved Node B
DL Downlink
DSP Digital Signal Processor
EDGE Enhanced Data rates for GSM Evolution
EGPRS Enhanced General Packet Radio Service
FN Frame Number
GSM Global System for Mobile Communications
GERAN GSM/EDGE Radio Access Network
GPRS General Packet Radio Service
GPS Global Positioning System
HARQ Hybrid Automatic Repeat Request
IMSI International Mobile Subscriber Identity
IoT Internet of Things
LTE Long-Term Evolution
MCS Modulation and Coding Scheme
MF Multiframe
MFRM Multiframe
MFRMS Multiframes
MME Mobility Management Entity
MS Mobile Station
MTC Machine Type Communications
NB Node B
N-PDU Network Protocol Data Unit
PCH Paging Channel
PDN Packet Data Network
PDTCH Packet Data Traffic Channel
PDU Protocol Data Unit
PS Packet Switched
RACH Random Access Channel
RAN Radio Access Network
RAT Radio Access Technology
RAU Routing Area Update
SGSN Serving GPRS Support Node
TDMA Time Division Multiple Access
TS Technical Specification
UE User Equipment
WCDMA Wideband Code Division Multiple Access
WiMAX Worldwide Interoperability for Microwave Access
Coverage Class (CC): At any point in time a wireless device belongs to a specific uplink/downlink coverage class that corresponds to either the legacy radio interface performance attributes that serve as the reference coverage for legacy cell planning (e.g., a Block Error Rate of 10% after a single radio block transmission on the PDTCH) or a range of radio interface performance attributes degraded compared to the reference coverage (e.g., up to 20 dB lower performance than that of the reference coverage). Coverage class determines the total number of blind transmissions to be used when transmitting/receiving radio blocks. An uplink/downlink coverage class applicable at any point in time can differ between different logical channels. Upon initiating a system access a wireless device determines the uplink/downlink coverage class applicable to the RACH/AGCH based on estimating the number of blind transmissions of a radio block needed by the BSS (radio access network node) receiver/wireless device receiver to experience a BLER (block error rate) of approximately 10%. The BSS determines the uplink/downlink coverage class to be used by a wireless device on the assigned packet channel resources based on estimating the number of blind transmissions of a radio block needed to satisfy a target BLER and considering the number of HARQ retransmissions (of a radio block) that will, on average, be needed for successful reception of a radio block using that target BLER. Note: a wireless device operating with radio interface performance attributes corresponding to the reference coverage (normal coverage) is considered to be in the best coverage class (i.e., coverage class 1) and therefore does not make any additional blind transmissions subsequent to an initial blind transmission. In this case, the wireless device may be referred to as a normal coverage wireless device. In contrast, a wireless device operating with radio interface performance attributes corresponding to an extended coverage (i.e., coverage class greater than 1) makes multiple blind transmissions. In this case, the wireless device may be referred to as an extended coverage wireless device. Multiple blind transmissions corresponds to the case where N instances of a radio block are transmitted consecutively using the applicable radio resources (e.g., the paging channel) without any attempt by the transmitting end to determine if the receiving end is able to successfully recover the radio block prior to all N transmissions. The transmitting end does this in attempt to help the receiving end realize a target BLER performance (e.g., target BLER≤10% for the paging channel).

eDRX cycle: eDiscontinuous reception (eDRX) is a process of a wireless device disabling its ability to receive when it does not expect to receive incoming messages and enabling its ability to receive during a period of reachability when it anticipates the possibility of message reception. For eDRX to operate, the network coordinates with the wireless device regarding when instances of reachability are to occur. The wireless device will therefore wake up and enable message reception only during pre-scheduled periods of reachability. This process reduces the power consumption which extends the battery life of the wireless device and is sometimes called (deep) sleep mode.

Extended Coverage: The general principle of extended coverage is that of using blind transmissions for the control channels and for the data channels to realize a target block error rate performance (BLER) for the channel of interest. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.

MTC device: A MTC device is a type of device where support for human interaction with the device is typically not required and data transmissions from or to the device are expected to be rather short (e.g., a maximum of a few hundred octets). MTC devices supporting a minimum functionality can be expected to only operate using normal cell contours and as such do not support the concept of extended coverage whereas MTC devices with enhanced capabilities may support extended coverage.

Nominal Paging Group: The specific set of EC-PCH blocks a device monitors once per eDRX cycle. The device determines this specific set of EC-PCH blocks using an algorithm that takes into account its IMSI, its eDRX cycle length and its downlink coverage class.

In the GSM/EDGE Radio Access Network (GERAN), a feature called extended discontinuous reception (eDRX) has been introduced. The eDRX feature extends the maximum legacy paging cycle of 2.12 seconds up to about 52 minutes and thereby allows wireless devices to still be reachable while at the same time saving the battery consumption of the wireless devices by allowing longer durations of sleep between reachability events. From a network perspective, when the eDRX feature is supported, it will need to be supported in all cells within a Routing Area thereby allowing the network to identify the point in time within an eDRX cycle that a given wireless device becomes reachable using its nominal paging group. This point in time when a wireless device is reachable will be the same regardless of the actual cell it is camped on. From a wireless device perspective, the wireless device will need to be able to determine this same point in time so it can wake up and read the same nominal paging group on the paging channel. The wireless device may need to take time drift as well as a possible change of location into account when determining how early it should wake up prior to its nominal paging group.

In order to reach a wireless device supporting eDRX, a Base Station Subsystem (BSS) (radio access network node) needs to transmit the page using the appropriate paging group, but with limited buffering capacity, the page request from the Serving GPRS Support Node (SGSN) (core network node) needs to be sent to the BSS shortly before the next occurrence of the wireless device's nominal paging group in order for the page request to avoid being discarded due to insufficient buffer capacity. In other words, when downlink data for a wireless device arrives at the SGSN, the SGSN needs to determine when the next instance of the nominal paging group for that particular wireless device occurs on the radio interface in order to be able to calculate the appropriate time to transmit the page request to the BSS.

There are currently two different techniques for the SGSN to determine when the nominal paging groups for wireless devices occur on the radio interface. In the first technique, the SGSN transmits a PAGING-PS Protocol Data Unit (PDU) to the BSS when downlink data arrives at the SGSN. If the BSS determines that the nominal paging group of the wireless device occurs too far into the future (e.g., the BSS is unable to buffer the paging request until the next occurrence of the nominal paging group for the indicated wireless device), the BSS responds to the PAGING-PS PDU by transmitting a PAGING-PS-REJECT PDU to the SGSN and includes therein information indicating the time until the next paging occasion (i.e., when the next instance of the nominal paging group for the wireless device occurs). This technique is disclosed in section 7.1 of 3GPP TS 48.018 V13.0.0 (December 2015) entitled "Base Station System (BSS)-Serving GPRS Support Node (SGSN); BSS GPRS Protocol (BSSGP)(Release 13)". The entire contents of this document are hereby incorporated by reference herein for all purposes.

In the second technique, the SGSN may transmit to the BSS a DUMMY-PAGING-PS PDU at any time to determine the time until the next paging occasion for the wireless device indicated therein. The BSS uses the information provided within the DUMMY-PAGING-PS PDU to calculate the time until the next paging occasion for the indicated wireless device and includes it within a DUMMY-PAGING-PS-RESPONSE PDU that the BSS transmits back to the SGSN. This method is mainly to be used when a BSS restart indication is received at the SGSN in order to allow the SGSN to adjust timing information for all wireless devices that use extended DRX. This technique is disclosed in the following: (1) the co-assigned U.S. application Ser. No. 15/154,708 entitled "Core Network Node and Method—Time Coordinated Cells for Extended Discontinuous Receive (eDRX)"; and (2) the co-assigned U.S. application Ser. No. 15/154,724 entitled "Radio Access Network Node and Method—Time Coordinated Cells for Extended Discontinuous Receive (eDRX)". The entire contents of each of these documents are hereby incorporated by reference herein for all purposes.

In the two existing techniques, for every instance of downlink data (e.g., an N-PDU) arriving at the SGSN for a given wireless device, the SGSN needs to transmit a corresponding PAGING-PS PDU or DUMMY-PAGING-PS PDU to the BSS, and the BSS needs to calculate the time until the next paging occasion for the indicated wireless device and return that information in the PAGING-PS-REJECT PDU or DUMMY-PAGING-PS-RESPONSE PDU to the SGSN, unless the paging request can be buffered in the BSS in the case for the PAGING-PS PDU. A problem with these two existing techniques is that the SGSN needs to perform these procedures every time the SGSN receives an instance of downlink data (e.g., N-PDU) for every individual wireless device, which can lead to a high signaling load across the Gb interface between the BSS and the SGSN. This problem is addressed by the present disclosure.

SUMMARY

A Core Network (CN) node (e.g., SGSN), and various methods for addressing the aforementioned problem are described in the independent claims. Advantageous embodiments of the CN node (e.g., SGSN), and various methods are further described in the dependent claims.

In one aspect, the present disclosure provides a CN node configured to interact with a Radio Access Network (RAN) node managing cells in a routing area. The CN node comprises a processor and a memory that stores processor-executable instructions, wherein the processor interfaces with the memory to execute the processor-executable instructions, whereby the CN node is operable to perform a first transmit operation, a first receive operation, a second receive operation, a calculate operation, and a second transmit operation. In the first transmit operation, the CN node transmits, to the RAN node, a paging message associated with a selected wireless device using a longest eDRX cycle of a plurality of eDRX cycles. In the first receive operation, the CN node receives, from the RAN node, a paging response message which includes a time remaining until a next paging occasion for the selected wireless device. In the second receive operation, the CN node receives a payload for one of a plurality of wireless devices which is using any one of the plurality of eDRX cycles. In the calculate operation, the CN node calculates a time remaining until a next paging occasion for the one of the plurality of wireless devices by utilizing the time remaining until a next paging occasion for the selected wireless device. In the second transmit operation, the CN node transmits, to at least the RAN node, another paging message associated with the one of the plurality of wireless devices, wherein the another paging message is transmitted a predetermined time before the next instance of the paging group (i.e., next paging occasion) for the one of the plurality of wireless devices. An advantage of the CN node performing these operations is a decreased signaling load across the interface between the CN node and the RAN nodes.

In another aspect, the present disclosure provides a method in a CN node configured to interact with a RAN node managing cells in a routing area. The method comprises a first transmitting step, a first receiving step, a second receiving step, a calculating step, and a second transmitting step. In the first transmitting step, the CN node transmits, to the RAN node, a paging message associated with a selected wireless device using a longest eDRX cycle of a plurality of eDRX cycles. In the first receiving step, the CN node receives, from the RAN node, a paging response message which includes a time remaining until a next paging occasion for the selected wireless device. In the second receiving step, the CN node receives a payload for one of a plurality of wireless devices which is using any one of the plurality of eDRX cycles. In the calculating step, the CN node calculates a time remaining until a next paging occasion for the one of the plurality of wireless devices by utilizing the time remaining until a next paging occasion for the selected wireless device. In the second transmitting step, the CN node transmits, to at least the RAN node, another paging message associated with the one of the plurality of wireless devices, wherein the another paging message is transmitted a predetermined time before the next instance of the paging group (i.e., next paging occasion) for the one of the plurality of wireless devices. An advantage of the CN node performing these steps is a decreased signaling load across the interface between the CN node and the RAN nodes.

In yet another aspect, the present disclosure provides a CN node configured to interact with a RAN node managing cells in a routing area. The CN node comprises a processor and a memory that stores processor-executable instructions, wherein the processor interfaces with the memory to execute the processor-executable instructions, whereby the CN node is operable to perform a first transmit operation, a first receive operation, a second receive operation, a calculate operation, and a second transmit operation. In the first transmit operation, the CN node transmits, to the RAN node, a first paging message associated with a first selected wireless device from a plurality of wireless devices using one eDRX cycle of a plurality of eDRX cycles. In the first receive operation, the CN node receives, from the RAN node, a first paging response message which includes a time remaining until a next paging occasion for the first selected wireless device. In the second receive operation, the CN node receives a payload for one of the plurality of wireless device ($104_3$) using the one eDRX cycle of the plurality of eDRX cycles. In the calculate operation, the CN node calculates a time remaining until a next paging occasion for the one of the plurality of wireless devices by utilizing the time remaining until a next paging occasion for the first selected wireless device. In the second transmit operation, the CN node transmits, to at least the RAN node, another paging message associated with the one of the plurality of wireless devices, wherein the another paging message is transmitted a predetermined time before the next instance of the paging group (i.e., next paging occasion) for the one of the plurality of wireless devices. An advantage of the CN node performing these operations is a decreased signaling load across the interface between the CN node and the RAN nodes.

In still yet another aspect, the present disclosure provides a method in a CN node configured to interact with a RAN node managing cells in a routing area. The method comprises a first transmitting step, a first receiving step, a second receiving step, a calculating step, and a second transmitting step. In the first transmitting step, the CN node transmits, to the RAN node, a first paging message associated with a first selected wireless device from a plurality of wireless devices using one eDRX cycle of a plurality of eDRX cycles. In the first receiving step, the CN node receives, from the RAN node, a first paging response message which includes a time remaining until a next paging occasion for the first selected wireless device. In the second receiving step, the CN node receives a payload for one of the plurality of wireless device ($104_3$) using the one eDRX cycle of the plurality of eDRX cycles. In the calculating step, the CN node calculates a time remaining until a next paging occasion for the one of the plurality of wireless devices by utilizing the time remaining until a next paging occasion for the first selected wireless device. In the second transmitting step, the CN node transmits, to at least the RAN node, another paging message associated with the one of the plurality of wireless devices, wherein the another paging message is transmitted a predetermined time before the next instance of the paging group (i.e., next paging occasion) for the one of the plurality of wireless devices. An advantage of the CN node performing these steps is a decreased signaling load across the interface between the CN node and the RAN nodes.

In yet another aspect, the present disclosure provides a CN node configured to interact with one or more RAN nodes managing cells in a routing area. The CN node comprises a processor and a memory that stores processor-executable instructions, wherein the processor interfaces with the memory to execute the processor-executable instructions, whereby the CN node is operable to perform an obtain operation, a receive operation, a calculate operation, and a transmit operation. In the obtain operation, the CN node obtains radio interface TDMA FN information applicable to the cells managed by any one of the one or more RAN nodes. In the receive operation, the CN node receives a payload for one of a plurality of wireless devices which is using any one of a plurality of eDRX cycles. In the calculate operation, the CN node calculates a time remaining until a next paging occasion for the one of the plurality of wireless devices by utilizing the obtained TDMA FN information. In the transmit operation, the CN node transmits, to the one or more RAN nodes, a paging message associated with the one of the plurality of wireless devices, wherein the paging message is transmitted a predetermined time before the next instance of the paging group (i.e., next paging occasion) for the one of the plurality of wireless devices. An advantage of the CN node performing these operations is a decreased signaling load across the interface between the CN node and the RAN nodes.

In still yet another aspect, the present disclosure provides a method in a CN node configured to interact with one or more RAN nodes managing cells in a routing area. The method comprises an obtaining step, a receiving step, a calculating step, and a transmitting step. In the obtaining step, the CN node obtains radio interface TDMA FN information applicable to the cells managed by any one of the one or more RAN nodes. In the receiving step, the CN node receives a payload for one of a plurality of wireless devices which is using any one of a plurality of eDRX cycles. In the calculating step, the CN node calculates a time remaining until a next paging occasion for the one of the plurality of wireless devices by utilizing the obtained TDMA FN information. In the transmitting, the CN node transmits, to the one or more RAN nodes, a paging message associated with the one of the plurality of wireless devices, wherein the paging message is transmitted a predetermined time before the next instance of the paging group (i.e., next paging occasion) for the one of the plurality of wireless devices. An advantage of the CN node performing these steps is a decreased signaling load across the interface between the CN node and the RAN nodes.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 1:
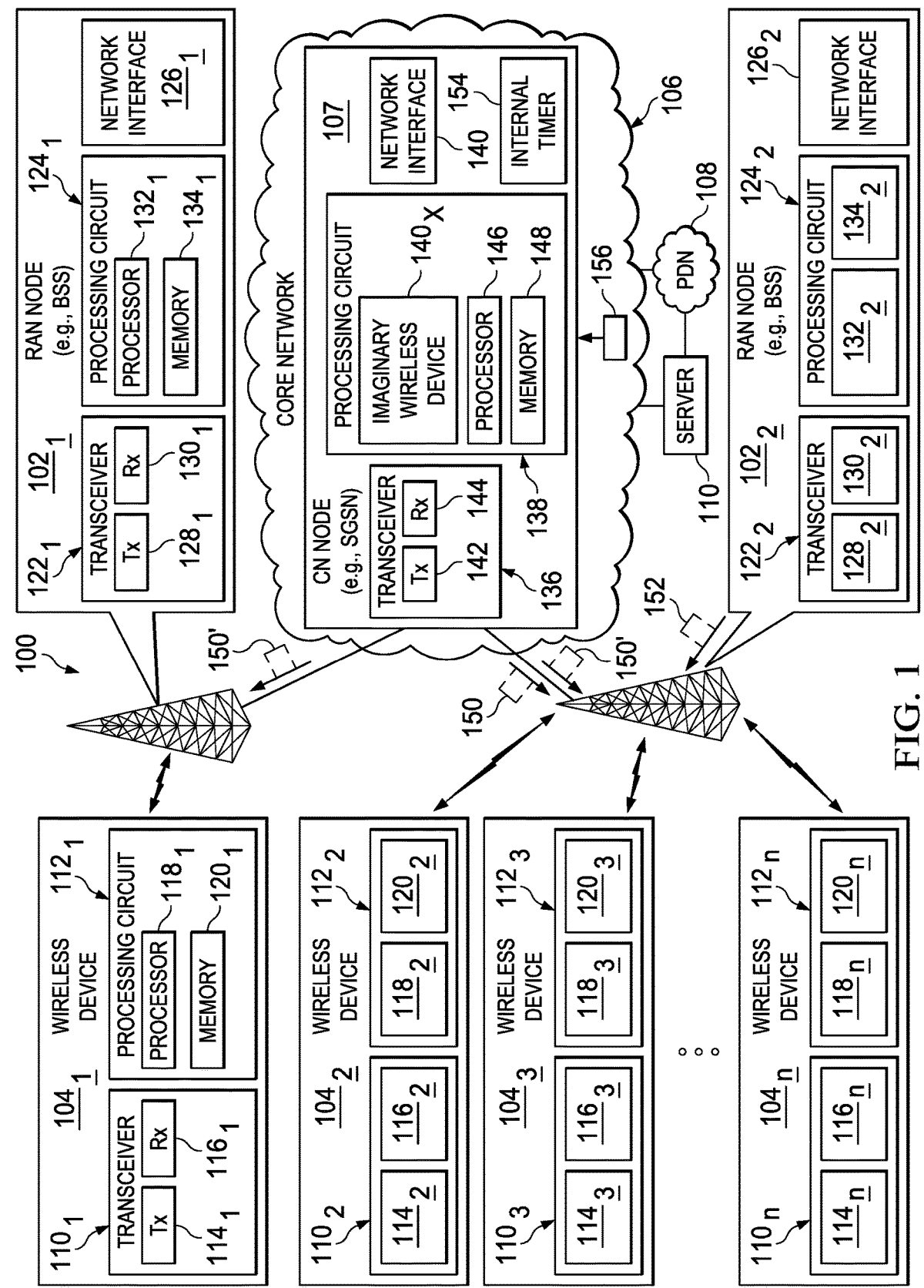
FIG. 1 is a diagram of an exemplary wireless communication network which includes a CN node, multiple RAN nodes, and multiple wireless devices configured in accordance with an embodiment of the present disclosure.

A discussion is provided first herein to describe an exemplary wireless communication network that includes a CN node (e.g., SGSN, MME), multiple RAN nodes (e.g., BSSs, NodeBs, eNodeBs), and multiple wireless devices (e.g., MSs, MTC devices) in accordance with an embodiment of the present disclosure (see FIG. 1). Then, a discussion is provided to disclose various techniques that the CN node (e.g., SGSN, MME) can use for determining reachability of wireless devices operating with extended discontinuous reception (eDRX) in accordance with different embodiments of the present disclosure (see FIG. 2). Thereafter, a discussion is provided to explain the basic functionalities-configurations of the CN node (e.g., SGSN, MME) in accordance with different embodiments of the present disclosure (see FIGS. 3-8).

Exemplary Wireless Communication Network 100

Referring to FIG. 1, there is illustrated an exemplary wireless communication network 100 in accordance with the present disclosure. The wireless communication network 100 includes a core network 106 (which comprises at least one CN node 107) and multiple RAN nodes 102$_1$ and 102$_2$ (only two shown) which interface with multiple wireless devices 104$_1$, 104$_2$, 104$_3$ . . . 104$_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the RAN nodes 102$_1$ and 102$_2$ (wireless access nodes—only two shown) which provide network access to the wireless devices $104_1, 104_2, 104_3 \ldots 104_n$. In this example, the RAN node $102_1$ is providing network access to wireless device $104_1$ while the RAN node $102_2$ is providing network access to wireless devices $104_2, 104_3 \ldots 104_n$. The RAN nodes $102_1$ and $102_2$ are connected to the core network 106 (e.g., SGSN core network 106) and, in particular, to the CN node 107 (e.g., SGSN 107). The core network 106 is connected to an external packet data network (PDN) 108, such as the Internet, and a server 110 (only one shown). The wireless devices $104_1, 104_2, 104_3 \ldots 104_n$ may communicate with one or more servers 110 (only one shown) connected to the core network 106 and/or the PDN 108.

The wireless devices $104_1, 104_2, 104_3 \ldots 104_n$ may refer generally to an end terminal (user) that attaches to the wireless communication network 100, and may refer to either a MTC device (e.g., a smart meter) or a non-MTC device. Further, the term "wireless device" is generally intended to be synonymous with the term mobile device, mobile station (MS). "User Equipment," or UE, as that term is used by 3GPP, and includes standalone wireless devices, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $102_1$ and $102_2$ (wireless access node $102_1$ and $102_2$) is used herein in the most general sense to refer to a base station, a wireless access node, or a wireless access point in a wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1, 104_2, 104_3 \ldots 104_n$ may include a transceiver circuit $110_1, 110_2, 110_3 \ldots 110_n$ for communicating with the RAN nodes $102_1$ and $102_2$, and a processing circuit $112_1, 112_2, 112_3 \ldots 112_n$ for processing signals transmitted from and received by the transceiver circuit $110_1, 110_2, 110_3 \ldots 110_n$ and for controlling the operation of the corresponding wireless device $104_1, 104_2, 104_3 \ldots 104_n$. The transceiver circuit $110_1, 110_2, 110_3 \ldots 110_n$ may include a transmitter $114_1, 114_2, 114_3 \ldots 114_n$ and a receiver $116_1, 116_2, 116_3 \ldots 116_n$, which may operate according to any standard, e.g., the GSM/EDGE standard. The processing circuit $112_1, 112_2, 112_3 \ldots 112_n$ may include a processor $118_1, 118_2, 118_3 \ldots 118_n$ and a memory $120_1, 120_2, 120_3 \ldots 120_n$ for storing program code for controlling the operation of the corresponding wireless device $104_1, 104_2, 104_3 \ldots 104_n$. The program code may include code for performing the procedures as described hereinafter.

Each RAN node $102_1$ and $102_2$ (wireless access node $102_1$ and $102_2$) may include a transceiver circuit $122_1$ and $122_2$ for communicating with wireless devices $104_1, 104_2, 104_3 \ldots 104_n$, a processing circuit $124_1$ and $124_2$ for processing signals transmitted from and received by the transceiver circuit $122_1$ and $122_2$ and for controlling the operation of the corresponding RAN node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$, and a memory $134_1$ and $134_2$ for storing program code for controlling the operation of the corresponding RAN node $102_1$ and $102_2$. The program code may include code for performing the procedures as described hereinafter.

The CN node 107 (e.g., SGSN 107, MME 107) may include a transceiver circuit 136 for communicating with one or more RAN nodes, e.g., the RAN nodes $102_1$ and $102_2$, a processing circuit 138 for processing signals transmitted from and received by the transceiver circuit 136 and for controlling the operation of the CN node 107, and a network interface 140 for communicating with one or more RAN nodes, e.g., the RAN nodes $102_1$ and $102_2$. The transceiver circuit 136 may include a transmitter 142 and a receiver 144, which may operate according to any standard, e.g., the GSM/EDGE standard. The processing circuit 138 may include a processor 146 and a memory 148 for storing program code for controlling the operation of the CN node 107. The program code may include code for performing the procedures as described hereinafter.

Techniques for Determining Reachability of Wireless Devices in eDRX Operation

As described in the Background Section, the two prior art techniques require that for every instance of downlink data (e.g., an N-PDU) arriving at the SGSN for any given wireless device, the SGSN needs to transmit a corresponding PAGING-PS PDU or DUMMY-PAGING-PS PDU to the BSS, and the BSS needs to calculate the time until the next paging occasion for the indicated wireless device and return that in the PAGING-PS-REJECT PDU or DUMMY-PAGING-PS-RESPONSE PDU to the SGSN, unless the paging request can be buffered in the BSS in the case for the PAGING-PS PDU. The problem with having the SGSN transmit a PAGING-PS PDU or a DUMMY-PAGING-PS PDU to the BSS every time downlink data arrives for a wireless device at the SGSN is addressed per the present disclosure by any one of the following techniques:

A first technique wherein the SGSN 107 (CN node 107) selects any BSS $102_1$ or $102_2$ (RAN node $102_1$ or $102_2$) managing cells in a given routing area and transmits to the selected BSS $102_1$ or $102_2$ (RAN node $102_1$ or $102_2$) a paging message 150 (e.g., PAGING-PS PDU 150 or a DUMMY-PAGING-PS PDU 150) for an imaginary wireless device 104x (note: a real wireless device $104_1, 104_2, 104_3 \ldots 104_n$ may be used as well; see discussion below). The imaginary wireless device 104x uses the longest allowed eDRX cycle (i.e., a quarter hyperframe) and has an IMSI which is selected so that the imaginary wireless device 104x has a corresponding nominal paging group that maps to the first 51 MF (or last 51 MF) in the set of 13312 51 MFs comprising the quarter hyperframe eDRX cycle (i.e., the longest allowed eDRX cycle). The selected BSS $102_2$ (RAN node $102_2$) (for example) upon receiving the paging message 150 transmits a corresponding paging response 152 to the SGSN 107 (CN node 107). The corresponding paging response 152 has the time until the next paging occasion for the selected imaginary wireless device 104x. The SGSN 107 (CN node 107) uses the time until the next paging occasion for the selected imaginary wireless device 104x to derive the time until the next paging occasion for any real wireless device $104_1, 104_2, 104_3 \ldots 104_n$ using any one of the twelve allowed eDRX cycles for which the SGSN 107 (CN node 107) subsequently receives a downlink PDU 156 (N-PDU 156) (detailed discussion provided below). It is to be noted that the SGSN 107 transmits the paging message 150 to a single BSS $102_2$ (for example) in the routing area as the radio interface associated with all cells in a routing area are subject to a certain timing tolerance, which the SGSN 107 may take into account when transmitting subsequent paging messages 150' for any real wireless device 104₁, 104₂, 104₃ . . . 104ₙ to all of the BSSs 102₁ (for example) managing cells in that routing area.

A second technique wherein the SGSN 107 (CN node 107) selects any BSS 102₁ or 102₂ (RAN node 102₁ or 102₂) managing cells in a given routing area and transmits to the selected BSS 102₁ or 102₂ (RAN node 102₁ or 102₂) a paging message 150 (e.g., PAGING-PS PDU 150 or a DUMMY-PAGING-PS PDU 150) for any given wireless device 104₁, 104₂, 104₃ . . . 104ₙ for each of the up to the twelve allowed eDRX cycles associated with the eDRX feature (see TABLE #1 which shows details about the twelve allowed eDRX cycles). That is, the SGSN 107 (CN node 107) could transmit twelve different paging messages 150 to the selected BSS 102₂ (RAN node 102₂) (for example) for twelve different wireless devices 104₁, 104₂, 104₃ . . . 104ₙ, each of which has a different one of the twelve allowed eDRX cycles. The selected BSS 102₂ (RAN node 102₂) (for example) upon receiving the twelve paging messages 150 transmits corresponding twelve paging responses 152 to the SGSN 107 (CN node 107). The corresponding twelve paging response 152 have the time until the next paging occasion for the respective twelve wireless devices 104. The SGSN 107 (CN node 107) would then use the time until the next paging occasion for the respective one of the twelve wireless devices 104 to derive the time until the next paging occasion for other wireless devices 104₁, 104₂, 104₃ . . . 104ₙ, for which the SGSN 107 (CN node 107) subsequently receives a downlink PDU 156 (N-PDU 156), that are using the same eDRX cycle as the respective one of the twelve wireless device 104₁, 104₂, 104₃ . . . 104ₙ (detailed discussion provided below).

A third technique wherein the SGSN 107 (CN node 107) can be made aware of the current radio interface TDMA FN information applicable to the cells managed by any given BSS 102₁ or 102₂ (RAN node 102₁ or 102₂) which then allows the SGSN 107 (CN node 107) to calculate the next paging opportunity for any wireless device 104₁, 104₂, 104₃ . . . 104ₙ having any one of the twelve allowed eDRX cycle lengths. In one example, the SGSN 107 (CN node 107) can be made aware of the current radio interface TDMA FN information by transmitting to any given BSS 102₁ or 102₂ (RAN node 102₁ or 102₂) a paging message 150 (e.g., PAGING-PS PDU 150 or a DUMMY-PAGING-PS PDU 150) for an imaginary wireless device 104*x* or real wireless device 104₁, 104₂, 104₃ . . . 104ₙ and receiving a corresponding paging response 152 that has information therein that enables the SGSN 107 (CN node 107) to derive the radio interface timing information (i.e., Time Division Multiple Access (TDMA) frame number information) for the cells managed by the selected BSS (RAN node 102₁ or 102₂). In another example, the SGSN 107 (CN 107) can be made aware of the current radio interface TDMA FN information by calculating the TDMA FN information from the GPS epoch information (discussed in detail below). In either example, once the SGSN 107 (CN node 107) has the TDMA FN information, it is able to calculate the next paging opportunity for any wireless device 104₁, 104₂, 104₃ . . . 104ₙ having any one of the twelve allowed eDRX cycle lengths (detailed discussion provided below).

Note: An advantage of these techniques is a decreased signaling load across the Gb interface between the SGSN 107 (CN node 107) and the BSSs 102₁ and 102₂.

Technique 1

Figure 2:
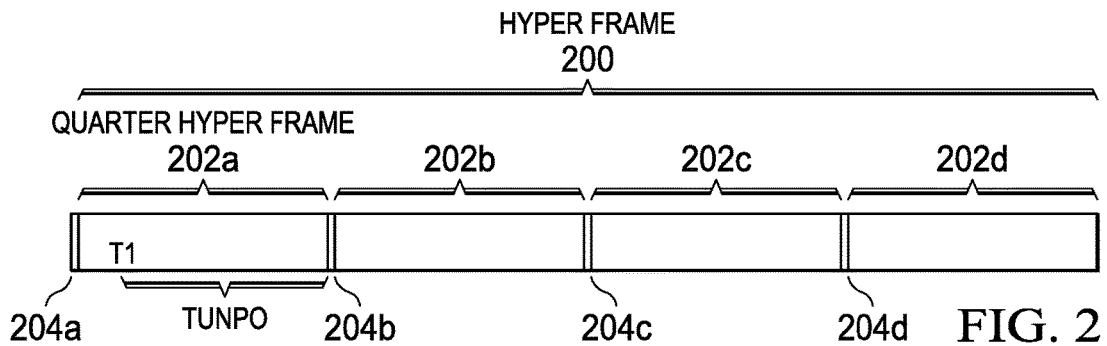
FIG. 2 is a diagram of a hyperframe which is used to explain how techniques 1, 2 and 3 are implemented in accordance with embodiments of the present disclosure.
Figure 3:
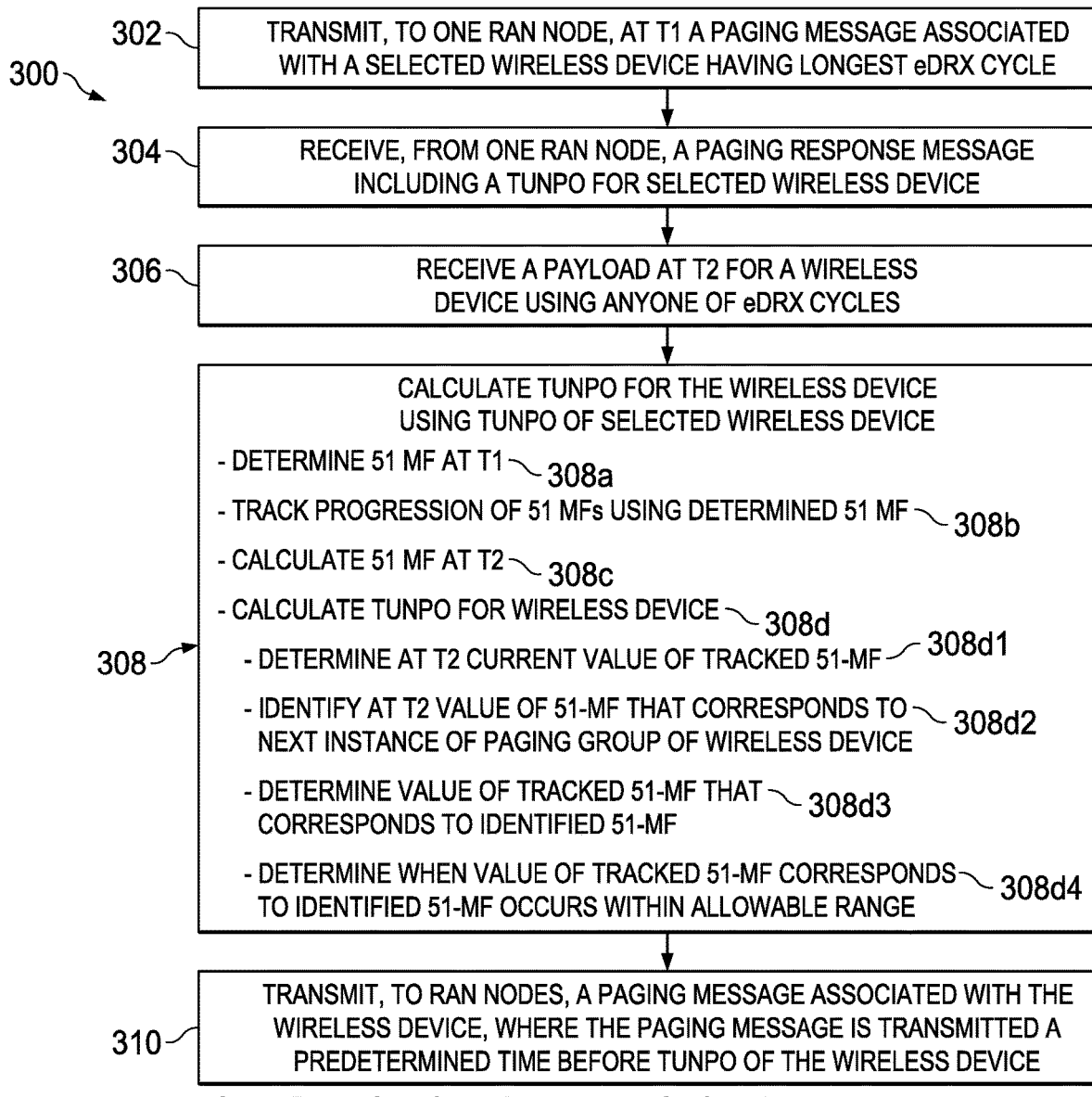
FIG. 3 is a flowchart of a method (technique 1) implemented in the CN node in accordance with an embodiment of the present disclosure.

Technique 1 involves the SGSN 107 (CN node 107) first considering an imaginary wireless device 104*x* that uses the longest allowed eDRX cycle (i.e., a quarter hyperframe) where the IMSI of the imaginary wireless device 104*x* is selected so that it has a corresponding nominal paging group that maps to the first 51 MF in the set of 13312 51 MFs comprising the quarter hyperframe eDRX cycle. The SGSN 107 (CN node 107) then selects any BSS 102₂ (RAN node 102₂) (for example) managing cells in a given routing area and transmits to the selected BSS 102₂ a paging message 150 (e.g., PAGING-PS PDU 150 or a DUMMY-PAGING-PS PDU 150) for the imaginary wireless device 140*x*. The selected BSS 102₂ upon receiving the paging message 150 transmits a corresponding paging response 152 to the SGSN 107. The corresponding paging response 152 has the time until the next paging occasion for the selected imaginary wireless device 104*x*. The SGSN 107 uses the time until the next paging occasion for the selected imaginary wireless device 140*x* to derive the time until the next paging occasion for any real wireless device 104₁, 104₂, 104₃ . . . 104ₙ using any one of the twelve allowed eDRX cycles for which the SGSN 107 (CN node 107) subsequently receives a downlink PDU 156 (N-PDU 156). A summary of the steps applicable to technique 1 is as follows:

Step 1: The SGSN 107 transmits a paging message 150 (e.g., a PAGING-PS PDU 150 or a DUMMY-PAGING-PS PDU 150) to a selected BSS 102₂ (RAN node 102₂) for a wireless device 104*x* (e.g., an imaginary wireless device 104*x* which is also referred to herein as wireless device Y) at a random point in time=T1. The paging message 150 includes a corresponding eDRX value and an IMSI value of the wireless device Y. The IMSI value of the imaginary wireless device Y is selected so that the IMSI value maps to a nominal paging group that occurs in the first 51-multiframe (or last 51 MF) in each quarter hyper frame (i.e., the longest eDRX cycle is used for the imaginary wireless device Y and therefore the included eDRX cycle value=13312) (see TABLE #1). FIG. 2 is a diagram of a hyperframe 200 which has four quarter hyperframes 202*a*, 202*b*, 202*c* and 202*d* where the T1 is shown in the first quarter hyperframe 202*a*, and each quarter hyperframe 202*a*, 202*b*, 202*c* and 202*d* has a corresponding first 51-MF 204*a*, 204*b*, 204*c* and 204*d*.

For example, the selection of an IMSI for the imaginary wireless device Y can be realized by ensuring its paging group=PAGING_GROUP_MF (0 . . . M–1)=mod (div (IMSI, BS_CC_CHANS), M)=(FN div 51) mod (BS_e-PA_MFRMS)=0, where:

BS_CC_CHANS ranges from 1 to 4 (i.e., it represents the number of control channels supported in a given cell).

M=Number of 51-multiframes per negotiated eDRX Cycle=BS_ePA_MFRMS (as illustrated in TABLE 1), and FN is the frame number.

BS_ePA_MFRMS is the number of 51-multiframes in a quarter hyperframe=13312

An example of an appropriate IMSI for the imaginary wireless device 104*x* would be IMSI=0.

TABLE #1

Set of twelve eDRX Cycles Supported

| eDRX cycle value | eDRX cycle length | Number of 51-MF per eDRX cycle (BS_ePA_MFRMS) | eDRX cycles per hyperframe |
|---|---|---|---|
| 0000 | ~1.9 seconds | 8 | 6656 |
| 0001 | ~3.8 seconds | 16 | 3328 |
| 0010 | ~7.5 seconds | 32 | 1664 |
| 0011 | ~12.2 seconds | 52 | 1024 |
| 0100 | ~24.5 seconds | 104 | 512 |
| 0101 | ~49 seconds | 208 | 256 |
| 0110 | ~1.63 minutes | 416 | 128 |
| 0111 | ~3.25 minutes | 832 | 64 |
| 1000 | ~6.5 minutes | 1664 | 32 |
| 1001 | ~13 minutes | 3328 | 16 |
| 1010 | ~26 minutes | 6656 | 8 |
| 1011 | ~52 minutes | 13312 | 4 |

Note 1:
53248 51-multiframes occur with the TDMA FN space (2715648 TDMA frames)
Note 2:
All remaining eDRX Cycle Values are reserved Step 2: The BSS $102_2$ (RAN node $102_2$) upon receiving the paging message 150 (e.g., PAGING-PS PDU 150, DUMMY-PAGING-PS PDU 150) at time T1 determines the 51-multiframe 204b in which the next paging opportunity will occur for the imaginary wireless device Y. One exemplary way that this next paging opportunity can be determined is discussed next. Since the BSS $102_2$ is aware of the current radio interface TDMA FN information applicable to the cells it manages, it knows the current 51-multiframe= (FN div 51)=X. The BSS $102_2$ then calculates the number of 51-multiframes from the 51-multiframe X until the next instance of 51-multiframe=0 that occurs within the context of eDRX cycle length=13312 (i.e., the BSS $102_2$ determines that the IMSI of the imaginary wireless device Y maps to the first 51-multiframe of a quarter hyperframe 202a, 202b, 202c, 202d and can therefore perform this calculation). This calculation is known herein as the "time until the next paging occasion" (TUNPO) and can be translated into minutes and seconds since each 51-multiframe has a duration of 235.38 ms. The BSS $102_2$ then includes the TUNPO in the paging response message 152 transmitted to the SGSN 107. As shown in FIG. 2, the TUNPO in this example is the duration of time from time T1 (receipt of the paging message 150) until the first MF 51 204b in the next quarter hyperframe 202b. For purposes of this discussion, assume the time required for the BSS $102_2$ to perform the TUNPO calculation to be 0 ms (i.e., instantaneous). In practice, a few milliseconds will be required to perform the TUNPO calculation, but this is insignificant considering that the value of the TUNPO calculated will be in multiples of 235.38 ms).

Step 3: The SGSN 107 upon receiving the paging response message 152 uses the TUNPO to determine the current 51-multiframe value=X by realizing T1 (the point at which the SGSN 107 transmitted the paging message 150 to the BSS $102_2$) precedes the first 51-multiframe 204b of the next quarter hyperframe 202b by the value indicated by TUNPO. Note: that since the SGSN 107 first selected an imaginary wireless device Y having an IMSI that maps to the first 51-multiframe of a quarter hyperframe 202a, 202b, 202c, 202d, the SGSN 107 will be able to use the received TUNPO to determine the current 51-multiframe value=X. The SGSN 107 can then keep track of the progression of 51-multiframes on the radio interface of cells managed by the BSS $102_2$ by running a corresponding SGSN internal timer 154 that expires every 235.38 ms (i.e., the duration of one 51-multiframe), at which point the value of X is incremented. It is to be noted that the TUNPO value returned by the BSS $102_2$ may be rounded off to the nearest second.

Step 4: Each time the SGSN 107 subsequently receives a downlink PDU 156 (N-PDU) 156 for any given real wireless device Z (e.g., wireless device $104_1$, $104_2$, $104_3$ ... $104_n$), the SGSN 107 calculates the next instance of the corresponding paging group (PAGING_GROUP_MF (0 . . . M−1)=mod (div (IMSI, BS_CC_CHANS), M)) using its knowledge of the current value of X (see step 3), the actual IMSI and registered eDRX cycle value of the given real wireless device Z (i.e., without transmitting a paging message 150 (PAGING-PS PDU 150, DUMMY-PAGING-PS PDU 150) to the BSS $102_1$ or $102_2$). The value of M is determined by the number of 51-multiframes per the registered (negotiated) eDRX Cycle for the given real wireless device Z which may be any one of the twelve possible eDRX cycles indicated by TABLE #1. For example, upon receiving a downlink PDU 156 (N-PDU) 156 for a given real wireless device Z at time T2 the SGSN 107 could proceeds as follows:

The SGSN 107 knows the value of the current 51-MF at time T2=X since it started tracking the value of the current 51 MF=X starting at time T1 (as per step 3).

The SGSN 107 calculates 51 MF Z=mod (div (IMSI, BS_CC_CHANS), M) where M=Number of 51-multiframes per negotiated eDRX cycle for the given real wireless device Z.

For example, if the current 51 MF=X=653 (range 0 to 13311) at time T2 and wireless device Z uses the lowest eDRX cycle length (M=8) and 51 MF Z=mod (div (IMSI, BS_CC_CHANS), M)=4 then the SGSN 107 proceeds as follows:

The SGSN 107 knows that since wireless device Z is using the lowest eDRX cycle (i.e., 8 51-MF) then exactly 6656 instances of the lowest eDRX cycle occur within each quarter hyperframe 202a, 202b, 202c and 202d (see TABLE #1).

In addition, since the SGSN 107 is considering a wireless device Z for which 51 MF Z=mod (div (IMSI, BS_CC_CHANS), M)=4, the SGSN 107 knows that wireless device Z will wake up to read its nominal paging group in the $5^{th}$ 51-MF of each of these 6656 instances of the lowest eDRX cycle that occur within each quarter hyperframe 202a, 202b, 202c and 202d.

Since the SGSN 107 knows that the current 51 MF=X=653 it knows that the $654^{th}$ 51-MF of the current quarter hyperframe 202a, 202b, 202c or 202d is in progress and so it divides 654 by 8 to determine how many sets of 8 51-MF have already occurred within the current quarter hyperframe 202a, 202b, 202c or 202d and which 51-MF in the current set of 8 51-MF corresponds to 51-MF=X=653.

In particular, 654/8=81.75 which means 81 sets of 8 51 MF blocks have already occurred since the start of the current quarter hyperframe and the current 51-MF=X is also the $6^{th}$ of the current set of 8 51 MFs (i.e., 0.75*8=6).

As a check, the SGSN 107 can determine that 81*8+6=654 which means the 654th 51-MF of the current quarter hyperframe is in progress (i.e., the current 51-MF=X=653 since the first 51-MF in a quarter hyperframe is numbered '0').

As such, since the $6^{th}$ 51-MF of the current set of 8 51-MF is in progress at time T2, the SGSN 107 determines that the next instance of MF Z=4 will occur 7 51 MFs from time T2 and will therefore defer transmitting a page for the wireless device Z accordingly.

The SGSN 107 can, upon receiving a downlink PDU (N-PDU) 156 for a given device Z at time T2, follow these same steps to determine when to page the given wireless device Z according to its eDRX cycle since the SGSN 107 (a) tracks the current 51-MF=X within the context of a quarter hyperframe and (b) each of the 12 possible eDRX cycle lengths occur an integral number of times within a quarter hyperframe 202a, 202b, 202c, and 202d.

Step 5: As the SGSN 107 continues to receive downlink PDUs 156 (N-PDUs) 156 for various real wireless devices 104$_1$, 104$_2$, 104$_3$ . . . 104$_n$, the SGSN 107 is able to determine when those real wireless devices 104$_1$, 104$_2$, 104$_3$ . . . 104$_n$ should be paged as per step 4. By doing this, the SGSN 107 is effectively in the non-stop process of building a list of IMSIs associated with each 51-multiframe for which the SGSN 107 has buffered corresponding downlink data 156 and therefore knows which real wireless device(s) 104$_1$, 104$_2$, 104$_3$ . . . 104$_n$ need to be paged (via paging message 150') every time the SGSN 107 increments the value of the current 51 MF=X.

Step 6: As X continues to be incremented such that its value is, for example, exactly 40 less than a 51-multiframe value for which downlink data 156 has been buffered, the SGSN 107 will react by transmitting a paging message 150' (e.g., PAGING-PS PDU 150', DUMMY-PAGING-PS PDU 150') for the corresponding IMSI. Note: that the value of 40 has been selected as an example and determines how early the SGSN 107 will transmit a paging message 150' for wireless device Z prior to the time at which nominal paging group of wireless device Z actually occurs. In practice this could be a range of values (e.g., 51-MF X could be a 51-MF that occurs anywhere in the range 30 to 40 51-MF prior to the 51-MF in which the nominal paging group of a wireless device occurs). For example, if the current value for X is such that X+40 corresponds to a 51-multiframe for which the SGSN 107 has buffered downlink data 156 for wireless device Z, the SGSN 107 transmits to one or more BSSs, e.g., the BSSs 102$_1$ and 102$_2$, a corresponding paging message 150' (e.g., PAGING-PS PDU 150', DUMMY-PAGING-PS PDU 150') for wireless device Z. It should be noted that transmitting of the paging message 150' (e.g., PAGING-PS PDU 150', DUMMY-PAGING-PS PDU 150') 40 51-multiframes early corresponds to transmitting the paging message 150' (e.g., PAGING-PS PDU 150', DUMMY-PAGING-PS PDU 150') about 10 seconds prior to the occurrence of the nominal paging group of wireless device Z on the radio interface. In addition, it should be noted that each cell in the same Routing Area will be synchronized (from a radio interface TDMA FN perspective) within a certain maximum allowed variation (e.g., less than 4 seconds, see section 5.2 of 3GPP TS 45.010 v13.0.0 (November 2015) entitled "Network; Radio subsystem synchronization (Release 13)"—the entire contents of this document are hereby incorporated by reference herein for all purposes). This allows the SGSN 107 to transmit the paging messages 150' (e.g., PAGING-PS PDUs 150', DUMMY-PAGING-PS PDUs 150') for the wireless device Z to all of the BSSs 102$_1$ and 102$_2$ (for example) managing cells in the paging area at the same time and still be assured that the paging messages 150' will be received in time (i.e., prior to the next instance of the corresponding PAGING_GROUP_MF for the wireless device Z).

A more detailed discussion and several examples of implementing the first technique is provided next.

In a first example of technique 1, in order to determine the timing of the underlying BSS 102$_2$ (for example), the SGSN 107 transmits a paging message 150 (PAGING-PS PDU 150, DUMMY-PAGING-PS PDU 150) for an imaginary wireless device Y (or a real wireless device 104$_1$, 104$_2$, 104$_3$ . . . 104$_n$) belonging to the longest eDRX cycle and using an IMSI that maps to a specific 51-multiframe in each quarter hyper frame 202a, 202b, 202c, and 202d (note: additional paging messages 150 (PAGING-PS PDUs 150, DUMMY-PAGING-PS PDUs 150) may be transmitted to the BSS 102$_2$ to adjust and verify the timing). The SGSN 107 (and BSS 102$_2$) uses an algorithm that maps the set of possible IMSIs evenly among all nominal paging groups within the set of 51-multiframes occurring within a given eDRX cycle. The two simplest cases are when the wireless device Y has an IMSI that maps to the first or the last 51-multiframe in the quarter hyper frame 202a, 202b, 202c, and 202d. For example, the SGSN 107 can select an IMSI for the wireless device Y that will map to either the first or the last 51-multiframe of an eDRX cycle using a process as follows:

The Common Control Channel (CCCH) on which the wireless device Y will listen for paging messages and make random accesses is determined by CCCH_GROUP, defined by:

CCCH_GROUP (0 . . . BS_CC_CHANS−1) of the wireless device Y=mod (div (IMSI, 3), BS_CC_CHANS) where BS_CC_CHANS ranges from 1 to 4 (i.e., it represents the number of control channels supported in a given cell).

The paging group is determined by the negotiated eDRX value. The 51-multiframe where the paging block is mapped within the applicable CCCH_GROUP occurs when:

PAGING_GROUP_MF (0 . . . M−1)=mod (div (IMSI, BS_CC_CHANS), M)=(FN div 51) mod (BS_ePA_M-FRMS), where M=Number of 51-multiframes per negotiated eDRX Cycle=BS_ePA_MFRMS (as illustrated in TABLE #1), and FN is the frame number.

Thereafter, the SGSN 107 transmits a paging message 150 (PAGING-PS PDU 150, DUMMY-PAGING-PS PDU 150) for the wireless device Y using the longest eDRX cycle and using an IMSI that maps to a nominal paging group occurring in the first 51-multiframe (for example) 204a, 204b, 204c, and 204d in each quarter hyper frame 202a, 202b, 202c, and 202d.

The following steps are used to derive a general method to determine when any paging group for any real wireless device 104$_1$, 104$_2$, 104$_3$ . . . 104$_n$, occurs on the air irrespective of the eDRX cycle.

1. At time T1, the SGSN 107 transmits a paging message 150 (PAGING-PS PDU 150, DUMMY-PAGING-PS PDU 150) to a BSS 102$_2$ (for example) for the wireless device Y belonging to the longest eDRX cycle and having an IMSI that maps to a nominal paging group occurring in the first 51-multiframe 204a, 204b, 204c, and 204d (for example) in each quarter hyper frame 202a, 202b, 202c, and 202d.

2. The BSS 102$_2$ returns the time until next paging occasion (TUNPO) for the wireless device Y in a paging response message 152 (PAGING-PS-REJECT PDU 152 or DUMMY-PAGING-PS-RESPONSE PDU 152) to the SGSN 107.

3. The SGSN 107 then uses the TUNPO to calculate how much earlier the first 51-multiframe (51MF#0) occurred in the quarter hyper frame in progress relative to time T1, which is when the SGSN 107 transmitted the paging message 150 (PAGING-PS PDU 150, DUMMY-PAGING-PS PDU 150) to the BSS 102$_2$. This parameter is referred to as the last occurrence of a paging occasion that maps to 51MF#0, denoted Last_time_51MF#0. Last_time_51MF#0=Quarter hyper frame cycle length (in seconds)−TUNPOsec=3,133.44 sec−TUNPOsec An alternative method is that the SGSN 107 calculates the current 51-multiframe within the quarter hyper frame and then keeps track of the current 51-multiframe within the quarter hyper frame (i.e., from TUNPO the SGSN 107 knows how long until the start of the next quarter hyperframe and can therefore determine how much time has elapsed for the current quarter hyperframe as of time T1. Once this is known the SGSN 107 can determine the value of the current 51-MF (i.e., a value somewhere in the range 0 to 13311) since each 51-MF spans 235.38 ms).

4. Once the Last_time_51MF#0 is found (and from that point forward tracked), the SGSN 107 uses it to calculate TUNPO for any real wireless device 104$_1$, 104$_2$, 104$_3$ ... 104$_n$ (wireless device Z) also using the longest eDRX cycle length by calculating the value of the 51 MF corresponding to its nominal paging group=mod (div (IMSI, BS_C-C_CHANS), M), where M=BS_ePA_MFRMS=13,312 and determining the next occurrence of the nominal paging group for any real wireless device 104$_1$, 104$_2$, 104$_3$ ... 104$_n$ (wireless device Z) also using the longest eDRX cycle length within the known cycle of 13,312 51 MFs.

It is to be noted that since this method allows the SGSN 107 to determine the specific 51-multiframe within a quarter hyper frame that is in progress at the point where the SGSN 107 transmitted the paging message 150 (PAGING-PS PDU 150, DUMMY-PAGING-PS PDU 150) to the BSS 102$_2$ for wireless device Y, the SGSN 107 can also calculate TUNPO for any real wireless device 104$_1$, 104$_2$, 104$_3$ ... 104$_n$ (wireless device Z) using any eDRX cycle length by calculating 51 MF Z=mod (div (IMSI, BS_CC_CHANS), M) where M=Number of 51-multiframes per negotiated eDRX cycle for the real wireless device Z=BS_ePA_MFRMS (as illustrated in TABLE #1)). For example, if real wireless device Z uses the lowest eDRX cycle length (M=8) and 51 MF Z=mod (div (IMSI, BS_CC_CHANS), M)=4 then the SGSN 107 will be able to calculate the next occurrence 51 MF Z=4 since the SGSN 107 is tracking the current 51-multiframe (range 0 to 13311 within a quarter hyper frame) and therefore knows when the next instance of 51 MF Z=4 occurs within the next block of 8 51-multiframes in the quarter hyper frame (i.e., as per TABLE #1, there are 6656 instances of these 8 51-multiframe blocks in the quarter hyper frame and the SGSN 107 will be able to calculate when the next instance of a set of 8 51-MF will occur and therefore when the 5$^{th}$ 51-MF in that set of 8 occurs).

A more detailed example of technique 1 is provided below.

It is presumed that the SGSN 107 needs to determine the time until the next paging occasion (TUNPO1) for a real wireless device Z (e.g., wireless device 104$_2$) with IMSIa=1234567890123456 and a negotiated eDRX cycle of 104 51-multiframes (BS_ePA_MFRMS=104) per eDRX cycle (or approximately 24.5 sec) at an arbitrary time T2. The following steps are performed by the SGSN 107.

1. Construct and hard code an IMSIb that is evenly divisible by 13312, i.e., for which mod (div (IMSI, BS_C-C_CHANS), M) gives a remainder of 0, e.g., 1234567890003968 or IMSI=0000000000000000. It is presumed that BS_CC_CHANS=1

2. At time T1, transmit the paging message 150 (PAGING-PS PDU 150, DUMMY-PAGING-PS PDU 150) to the BSS 102$_2$ (for example) with IMSI=0000000000000000 and eDRX cycle set to the longest eDRX cycle corresponding to 13,312 51-multiframes per eDRX cycle. It is presumed that, for example, the BSS 102$_2$ responds with TUNPO=34 min and 3 sec=2,040 sec (i.e., the first 51-MF of the next quarter hyperframe will occur in 2,040 seconds).

3. Calculate when the first 51-multiframe occurred in the quarter hyper frame relative to time T1, which is when the SGSN 107 transmitted the paging message 150 (PAGING-PS PDU 150, DUMMY-PAGING-PS PDU 150) to the BSS 102$_2$, denoted Last_time_51MF#0=Cycle length−TUNPOsec=3,133.44−2,040=1,093.44 sec. A timer $T_{MF}$ having a value of 235.38 ms is now started in the SGSN 107 allowing the SGSN 107 to track the ongoing occurrence of 51-multiframes sent on the radio interface within each quarter hyper frame 202$a$, 202$b$, 202$c$ and 202$d$ (i.e., at time T1, the value of the current 51-MF is set to (Last_time_51MF#0 div 0.23538)=1093.44/0.23538=4646 and incremented by 1 every time $T_{MF}$ expires).

4. At an arbitrary point in time T2 during the same or a subsequent quarter hyperframe, the SGSN 107 receives downlink data for the real wireless device Z, determines that (for example) the value of the current 51-MF=12745 (i.e., the 12745$^{th}$ 51-MF of the 13312 51-MF comprising the quarter hyperframe in progress) and proceeds as follows:

Calculate the paging multiframe number (nominal paging group) for the real wireless device Z with IMSIa=1234567890123456 as follows: PG_MF=mod (div (1234567890123456, 1), 104)=96 (i.e., the nominal paging group of wireless device Z occurs in the 97$^{th}$ 51-MF of a 104 51-MF eDRX cycle).

12745/104=122.55→122 instances of the 104 51-MF eDRX cycle have already occurred for the current quarter hyperframe and that the 57$^{th}$ 51-MF of the current 104 51-MF eDRX cycle is in progress (104*0.55=57).

The next occurrence of the 97$^{th}$ 51-MF of a 104 51-MF eDRX cycle occurs in 40 51-MF (about 9.41 seconds) or, alternatively, during the 12785$^{th}$ 51-MF of the quarter hyperframe in progress.

In another detailed example of technique 1, the SGSN 107 transmits to the BSS 102$_2$ (for example) the paging message 150 (PAGING-PS PDU 150, DUMMY-PAGING-PS PDU 150) for a wireless device Y (for example) belonging to the longest eDRX cycle and having an IMSI that maps to a nominal paging group occurring in the last 51-multiframe in each quarter hyper frame 202$a$, 202$b$, 202$c$, and 202$d$. The following steps are part of a general method to determine when any paging group for any given wireless device 104$_1$, 104$_2$, 104$_3$ ... 104$_n$ occurs on the air irrespective of the eDRX cycle.

1. At time T1, the SGSN 107 transmits to the BSS 102$_2$ (for example) the paging message 150 (PAGING-PS PDU 150, DUMMY-PAGING-PS PDU 150) for the wireless device Y belonging to the longest eDRX cycle and having an IMSI that maps to a nominal paging group occurring in the last 51-multiframe in each quarter hyper frame.

2. The BSS 102$_2$ returns the time until the next paging occasion (TUNPO) for the wireless device Y in the paging response message 152 (PAGING-PS-REJECT PDU 152, DUMMY-PAGING-PS-RESPONSE PDU 152) to the SGSN 107. This provides the SGSN 107 with information of when (in seconds) the last 51-multiframe occurs in the quarter hyper frame relative to time T1, which is when the SGSN 107 transmitted the paging message 150 (PAGING-PS PDU 150, DUMMY-PAGING-PS PDU 150).

3. The SGSN 107 then uses the TUNPO to calculate how much earlier the first 51-multiframe (51MF#0) occurred in the quarter hyper frame in progress relative to time T1, which is when the SGSN 107 transmitted the paging message 150 (PAGING-PS PDU 150, DUMMY-PAGING-PS PDU 150) to the BSS 102₂. This parameter is referred to as the last occurrence of a paging occasion that maps to 51MF#0, denoted Last_time_51MF#0. Last_time_51MF#0=Quarter hyper frame cycle−TUN-POsec=3,133.44 sec−TUNPOsec 4. Once Last_time_51MF#0 is found (and from that point forward tracked), the SGSN 107 can also calculate the TUNPO for any real wireless device 104₁, 104₂, 104₃ . . . 104ₙ (wireless device Z) using any eDRX cycle length by calculating the value of the 51 MF corresponding to its nominal paging group=51 MF Z=mod (div (IMSI, BS_C-C_CHANS), M) where M=Number of 51-multiframes per negotiated eDRX cycle for device Z=BS_ePA_MFRMS (as illustrated in TABLE #1). A more detailed concrete example for this particular example is provided below.

It is presumed that the SGSN 107 needs to determine the time until the next paging occasion (TUNPO1) for a real wireless device Z (e.g., wireless device 104₂) with IMSIa=1234567890123456 and a negotiated eDRX cycle of 104 51-multiframes (BS_ePA_MFRMS=104) per eDRX cycle (or approximately 24.5 sec) at an arbitrary time T2. The following steps are performed by the SGSN 107.

1. Construct and hard code an IMSIb that is evenly divisible by 13312, i.e., for which mod (div (IMSI, BS_C-C_CHANS), M) gives a remainder of 13311, e.g., 1234567890003967. It is presumed that BS_CC_CHANS=1

2. Transmit the paging message 150 (PAGING-PS PDU 150, DUMMY-PAGING-PS PDU 150) to the BSS 102₂ (for example) with eDRX cycle set to the longest eDRX cycle corresponding to 13,312 51-multiframes per eDRX cycle. It is presumed that, for example, the BSS 102₂ responds with TUNPO=34 min and 3 sec=2,040 sec (i.e., the last 51-MF of the current quarter hyperframe will occur in 2,040 seconds).

3. Calculate when the first 51-multiframe occurred in the quarter hyper frame relative to time T1, which is when the SGSN 107 transmitted the paging message 150 (PAGING-PS PDU 150, DUMMY-PAGING-PS PDU 150) to the BSS 102₂, denoted Last_time_51MF#0=Cycle length−TUN-POsec=3,133.44−2,040=1,093.44 sec. A timer $T_{MF}$ having a value of 235.38 ms is now started in the SGSN 107 allowing the SGSN 107 to track the ongoing occurrence of 51-multiframes sent on the radio interface within each quarter hyper frame (i.e., at time T1, the value of the current 51-MF is set to (Last_time_51MF#0 div 0.23538)=1093.44/0.23538=4646 and incremented by 1 every time $T_{MF}$ expires).

4. At an arbitrary point in time T2 during the same or a subsequent quarter hyperframe, the SGSN 107 receives downlink data for a real wireless device Z, determines that (for example) the value of the current 51-MF=12745 (i.e., the 12745$^{th}$ 51-MF of the 13312 51-MF comprising the quarter hyperframe in progress) and proceeds as follows:

Calculate the paging multiframe number (nominal paging group) for the real wireless device Z with IMSIa=1234567890123456 as follows: PG_MF=mod (div (1234567890123456, 1), 104)=96 (i.e., the nominal paging group of wireless device Z occurs in the 97th 51-MF of a 104 51-MF eDRX cycle).

12745/104=122.55→122 instances of the 104 51-MF eDRX cycle have already occurred for the current quarter hyperframe and that the 57$^{th}$ 51-MF of the current 104 51-MF eDRX cycle is in progress (104*0.55=57).

The next occurrence of the 97$^{th}$ 51-MF of a 104 51-MF eDRX cycle occurs in 40 51-MF (about 9.41 seconds) or, alternatively, during the 12785$^{th}$ 51-MF of the quarter hyperframe in progress.

Technique 2

Technique 2 involves the SGSN 107 first randomly selecting a wireless device 104₁, 104₂, 104₃ . . . 104ₙ that uses any one of the twelve possible eDRX cycles (see TABLE #1). The SGSN 107 then selects any BSS 102₁ or 102₂ managing cells in a given routing area and transmits to the selected BSS 102₁ (for example) a paging message 150 (e.g., PAGING-PS PDU 150 or a DUMMY-PAGING-PS PDU 150) for the randomly selected wireless device 104₂ (for example). The selected BSS 102₂ upon receiving the paging messages 150 transmits a corresponding paging response message 152 to the SGSN 107. The corresponding paging response message 152 includes the time until the next paging occasion for the randomly selected wireless device 104₂ (for example). The SGSN 107 uses this information to derive the time until the next paging occasion for any other wireless device 104₁, 104₃ . . . 104ₙ using the same eDRX cycle for which the SGSN 107 subsequently receives a downlink PDU (N-PDU) 156 from the network. The SGSN 107 can repeat this process for each of the 12 possible eDRX cycles and thereby become able to determine the time until the next paging occasion for any wireless device 104₁, 104₂, 104₃ . . . 104ₙ that uses any of the 12 possible eDRX cycle lengths for which the SGSN 107 subsequently receives a downlink PDU (N-PDU) from the network. A summary of the steps applicable to technique 2 is as follows:

Step 1; In the example considered the SGSN 107 transmits a paging message 150 (e.g., a PAGING-PS PDU 150 or a DUMMY-PAGING-PS PDU 150) to a selected BSS 102₂ (RAN node 102₂) for a randomly selected wireless device Y' (wireless device 104₁, 104₂, 104₃ . . . 104ₙ) at a random point in time=T1 and includes the IMSI and corresponding registered eDRX cycle value for the randomly selected wireless device Y' (for example).

Step 2: The BSS 102₂ (RAN node 102₂), upon receiving paging message 150 (e.g., PAGING-PS PDU 150, DUMMY-PAGING-PS PDU 150) at time T1 for the wireless device Y' using a given eDRX cycle length M, determines the 51-multiframe in which the next the paging opportunity will occur for that wireless device Y'. One way that this next paging opportunity can be determined is discussed next. Since the BSS 102₂ is aware of the current radio interface TDMA FN information applicable to the cells it manages, it knows the current 51-multiframe=(FN div 51)=X. The BSS 102₂ then calculates the number of 51-multiframes from the 51-multiframe X until the next instance of 51-multiframe=mod (div (IMSI, BS_CC_CHANS), M)=the next paging opportunity for wireless device Y' that occurs within the context of the negotiated eDRX cycle length for wireless device Y'. The result of this calculation is known herein as the "time until the next paging occasion" (TUNPO) and can be translated into minutes and seconds since each 51-multiframe has a duration of 235.38 ms. The BSS 102₂ then includes the TUNPO in the paging response message 152 transmitted to the SGSN 107. For purposes of this discussion, assume the time required for the BSS 102₂ to perform the TUNPO calculation to be 0 ms (i.e., instantaneous). In practice a few milliseconds will be required to perform the TUNPO calculation but this is insignificant considering that the value of the TUNPO calculated will be in multiples of 235.38 ms).

The paging group of the randomly selected wireless device Y'=PAGING_GROUP_MF (0 . . . M−1)=mod (div (IMSI, BS_CC_CHANS), M)=(FN div 51) mod (BS_e-PA_MFRMS), where:

BS_CC_CHANS ranges from 1 to 4 (i.e., it represents the number of control channels supported in a given cell).

M=Number of 51-multiframes per negotiated eDRX Cycle=BS_ePA_MFRMS (as illustrated in Table 1), and FN is the frame number.

BS_ePA_MFRMS is the number of 51-multiframes in eDRX cycle length negotiated by the device using NAS signaling.

Step 3: Once the TUNPO for wireless device Y' has been received, the SGSN 107 can determine the current 51-multiframe value=X by realizing T1 precedes the next instance of 51-multiframe=mod (div (IMSI, BS_CC_CHANS), M) for wireless device Y' (using eDRX cycle length L) by the value indicated by TUNPO. Note: that since the SGSN 107 first selected a wireless device Y', the SGSN 107 can determine the next paging opportunity for wireless device Y'=mod (div (IMSI, BS_CC_CHANS), M) and therefore uses the received TUNPO to determine the current 51-multiframe value=X. The SGSN 107 can then keep track of the progression of 51-multiframes on the radio interface of cells managed by the BSS 102$_2$ by running a corresponding SGSN internal timer T 154 that expires every 235.38 ms (i.e., the duration of one 51-multiframe) at which point the value of X is incremented. It is to be noted that the TUNPO value returned by the BSS 102$_2$ may be rounded off to the nearest second.

Step 4: Each time the SGSN 107 receives a downlink PDU (N-PDU) 156 for any other wireless device Z' (e.g., wireless device 104$_1$, 104$_3$ ... 104$_n$) that uses the same eDRX cycle length as wireless device Y', the SGSN 107 can calculate for wireless device Z' the next instance of the corresponding PAGING_GROUP_MF (0 ... M–1)=mod (div (IMSI, BS_CC_CHANS), M) using its knowledge of the current value of X as described in step 3 (i.e., without transmitting a PAGING-PS PDU 150 or a DUMMY-PAGING-PS PDU 150 to a BSS 102$_1$ or 102$_2$). The value of M is determined by the number of 51-multiframes per the registered (negotiated) eDRX Cycle for wireless device Z' which has the same one of the 12 possible eDRX cycles as wireless device Y' (see TABLE #1). For example, upon receiving at time T2 a downlink PDU (N-PDU) 156 for wireless device Z' which is using the same eDRX cycle length as wireless device Y' the SGSN 107 can proceed as follows:

The SGSN 107 knows the value of the current 51-MF at time T2=X since it started tracking the value of the current 51 MF=X starting at time T1 (as per step 3).

The SGSN 107 calculates 51 MF Z'=mod (div (IMSI, BS_CC_CHANS), M) where M=Number of 51-multiframes for the applicable eDRX cycle length for wireless device Z'.

For example, steps 1 to 3 can be assumed to be performed by the SGSN 107 for a wireless device Y' that uses the 4$^{th}$ lowest eDRX cycle. If the current 51-MF=X=13 (range 0 to 51 for the 4th lowest eDRX cycle) at time T2 and wireless device Z' uses the 4$^{th}$ lowest eDRX cycle length (M=52) and 51 MF Z'=mod (div (IMSI, BS_CC_CHANS), M)=33 then the SGSN 107 proceeds as follows:

The SGSN 107 knows that since the wireless device Z' is using the 4th lowest eDRX cycle (i.e., 52 51-MF) then exactly 1024 instances of the 4$^{th}$ lowest eDRX cycle occur within each quarter hyperframe 202$a$, 202$b$, 202$c$ and 202$d$ (see TABLE #1).

In addition, since this example uses a wireless device Z' for which 51 MF Z'=mod (div (IMSI, BS_CC_CHANS), M)=33, the SGSN 107 knows that the wireless device Z' will wake up to read its nominal paging group in the 34$^{th}$ 51-MF of each of these 1024 instances of the 4$^{th}$ lowest eDRX cycle that occur within each quarter hyperframe 202$a$, 202$b$, 202$c$ and 202$d$.

As such, since the 14$^{th}$ 51-MF of the current set of 52 51-MF is in progress at time T2, the SGSN 107 determines that the next instance of MF Z'=33 will occur 20 51 MFs from time T2 and will therefore defer transmitting a page for wireless device Z' accordingly.

Upon receiving a downlink PDU (N-PDU) 156 at time T2 for a wireless device Z" using an eDRX cycle for which steps 1 through 3 have not yet been performed, the SGSN 107 repeats steps 1 through 3 for that eDRX cycle. It will then be able to determine when to page the wireless device Z" using that eDRX cycle following the same principles as described above with respect to step 4 for the example of the 4$^{th}$ lowest eDRX cycle described.

Note: The main differences in technique 1's step 4 and technique 2's step 4 are that (a) a single instance of performing steps 1 through 3 is required for technique 1 whereas up to 12 instances of performing steps 1 through 3 are required by technique 2; (b) technique 1 requires that the SGSN 107 perform more calculations compared to technique 2 when determining when to page any given wireless device 104$_1$, 104$_3$ ... 104$_n$; and (c) technique 1 requires the selection of an imaginary wireless device 104$x$ (or a real wireless device 104$_1$, 104$_2$, 104$_3$ ... 104$_n$) that uses the longest eDRX cycle and has an IMSI that necessarily maps to a nominal paging group that occurs in the first (or last) 51-MF of the set of 13312 51-MF comprising the longest eDRX cycle whereas technique 2 requires the selection of up to 12 real wireless devices 104$_1$, 104$_2$, 104$_3$ ... 104$_n$ with the only requirement being that each wireless device uses a different eDRX cycle (i.e., device selection procedure is simpler for technique 2).

Step 5: As the SGSN 107 continues to receive downlink PDUs (N-PDUs) 156 for various wireless device 104$_1$, 104$_3$ ... 104$_n$ using the same eDRX cycle length as wireless device Y', the SGSN 107 is able to determine when they should be paged as per step 4. By repeating steps 1-4 for a wireless device 104$_1$, 104$_3$ ... 104$_n$ in each of the 12 eDRX cycles, the SGSN 107 is effectively in the non-stop process of building 12 eDRX cycle specific lists of IMSIs associated with each 51-multiframe for which the SGSN 107 has buffered corresponding downlink data 156 and therefore knows which wireless device(s) 104$_1$, 104$_2$, 104$_3$ ... 104$_n$ need to be paged every time the SGSN 107 increments the value of the current 51 MF=X.

Step 6: As X continues to be incremented such that its value is, for example, exactly 40 less than a 51-multiframe value for which downlink data 156 has been buffered for a wireless device Z', the SGSN 107 will react by transmitting a paging message 150' (e.g., PAGING-PS PDU 150', DUMMY-PAGING-PS PDU 150') for the corresponding IMSI. Note: that the value of 40 has been selected as an example and determines how early the SGSN 107 will transmit a paging message 150' for wireless device Z' prior to the time at which nominal paging group of wireless device Z' actually occurs. In practice this could be a range of values (e.g., 51-MF X could be a 51-MF that occurs anywhere in the range 30 to 40 51-MF prior to the 51-MF in which the nominal paging group of a wireless device occurs). For example, if the current value for X is such that X+40 corresponds to a 51-multiframe for which the SGSN 107 has buffered downlink data 156 for wireless device 104₃ (for example), the SGSN 107 transmits to at least the selected BSS 102₂ (in some embodiments, both BSSs 102₁ and 102₂) a corresponding paging message 150' (e.g., PAGING-PS PDU 150', DUMMY-PAGING-PS PDU 150') for wireless device 104₃. It should be noted that transmitting of the paging message 150' (e.g., PAGING-PS PDU 150', DUMMY-PAGING-PS PDU 150') 40 51-multiframes early corresponds to transmitting the paging message 150' (e.g., PAGING-PS PDU 150', DUMMY-PAGING-PS PDU 150') about 10 seconds prior to the occurrence of the nominal paging group of wireless device 104₃ on the radio interface. In addition, it should be noted that each cell in the same Routing Area will be synchronized (from a radio interface TDMA FN perspective) within a certain maximum allowed variation (e.g., less than 4 seconds, see section 5.2 of 3GPP TS 45.010 v13.0.0 (November 2015) entitled "Network; Radio subsystem synchronization (Release 13)"—the entire contents of this document are hereby incorporated by reference herein for all purposes). This allows the SGSN 107 to transmit the paging messages 150' (e.g., PAGING-PS PDUs 150', DUMMY-PAGING-PS PDUs 150') for the wireless device 104₃ to all of the BSSs 102₁ and 102₂ (for example) managing cells in the paging area at the same time and still be assured that the paging messages 150' will be received in time (i.e., prior to the next instance of the corresponding PAGING_GROUP_MF for the wireless device 104₃).

A more detailed discussion and several examples of implementing the first technique is provided next.

The second technique if desired can include mapping the set of possible IMSIs for all the wireless devices 104₁, 104₂, 104₃ . . . 104ₙ evenly among all nominal paging groups within the set of 51-multiframes occurring within a given eDRX cycle using an algorithm such as the one shown below.

The CCCH on which a wireless device 104₁, 104₂, 104₃ . . . 104ₙ will listen for paging messages and make random accesses is determined by CCCH_GROUP, defined by:
   CCCH_GROUP (0 . . . BS_CC_CHANS−1) of the specific wireless device=mod (div (IMSI, 3), BS_CC_CHANS) where
   BS_CC_CHANS ranges from 1 to 4 (i.e., it represents the number of control channels supported in a given cell).
The paging group is determined by the negotiated eDRX value. The 51-multiframe where the paging block is mapped within the applicable CCCH_GROUP occurs when:
   PAGING_GROUP_MF (0 . . . M−1)=mod (div (IMSI, BS_CC_CHANS), M)=(FN div 51) mod (BS_ePA_MFRMS), where
   M=Number of 51-multiframes per negotiated eDRX Cycle=BS_ePA_MFRMS (as illustrated in Table 1), and FN is the frame number.

The mapping of the set of possible IMSIs for all the wireless devices 104₁, 104₂, 104₃ . . . 104ₙ evenly among all nominal paging groups within the set of 51-multiframes occurring within a given eDRX cycle is beneficial because it allows all bandwidth available for transmitting paging messages to be used efficiently.

Using the second technique, the SGSN 107 transmits a paging message 150 (e.g., PAGING-PS PDU 150, DUMMY-PAGING-PS PDU 150) for any given wireless device 104₁, 104₂, 104₃ . . . 104ₙ (note: the IMSI does not need to be selected to occur in the first or the last 51-multiframe of an eDRX cycle) per each supported eDRX cycle to a BSS 102₂ (for example) to determine the overall BSS timing for any given eDRX cycle. Additional paging messages 150 (e.g., PAGING-PS PDUs 150, DUMMY-PAGING-PS PDUs 150) could be transmitted to verify or adjust the time kept in the SGSN for each individual eDRX cycle length. In one example, the SGSN 107 can determine when any paging group occurs on the radio interface for each possible eDRX cycle by performing the following steps:

1. At time T1, the SGSN 107 transmits a paging message 150 (e.g., PAGING-PS PDU 150, DUMMY-PAGING-PS PDU 150) for wireless device X (including its eDRX cycle=eDRX1). The simplest case is when the wireless device X has an IMSI that maps to the first or the last 51-multiframe for each eDRX cycle length.

2. The SGSN 107 receives TUNPO in the paging response message 152 (e.g., PAGING-PS-REJECT PDU 152, DUMMY-PAGING-PS-RESPONSE PDU 152) and thereby knows when the next paging opportunity occurs for wireless device X for eDRX cycle=eDRX1 relative to time T1.

3. The TUNPO refers to "MFX"=the nominal paging group of wireless device X=mod (div (IMSI, BS_CC_CHANS), M) where M reflects the number of 51-multiframes per eDRX cycle=eDRX1. The SGSN 107 uses the value "MFX" (i.e., the value of the 51-MF in which the nominal paging group of wireless device X occurs) and TUNPO to determine the value of 51-MF at time T1. It can then continue to track the ongoing value of the 51-MF in progress by incrementing it once every 235.38 ms (i.e., the duration of a single 51-MF is 235.38 ms).

4. Upon receiving downlink data for wireless device Y (not to be confused for the aforementioned imaginary wireless device Y in technique 1) at time T2, the SGSN 107 can then calculate "MFY"=the nominal paging group of wireless device Y=mod (div (IMSI, BS_CC_CHANS), M) for any other wireless device Y (for example) using the same eDRX cycle=eDRX1 and thereby determines TUNPO for wireless device Y as the difference between "MFX" and "MFY" (i.e., this difference is an integral number of 51-multiframes), which is converted to seconds thereby allowing the SGSN 107 to determine the TUNPO for wireless device Y.

5. By transmitting a paging message 150 (e.g., PAGING-PS PDU 150, DUMMY-PAGING-PS PDU 150) for a wireless device for each possible eDRX cycle (i.e., eDRX1, eDRX2, eDRX3, eDRX12), the SGSN 107 uses the TUNPO indicated in each corresponding paging response message 152 (e.g., PAGING-PS-REJECT PDU 152, DUMMY-PAGING-PS-RESPONSE PDU 152) to determine the next paging opportunity for any wireless devices 104₁, 104₂, 104₃ . . . 104ₙ using any one of eDRX1 through eDRX12 (as per the above steps 3 and 4).

6. The SGSN 107 needs to transmit a maximum of 12 paging messages 150 (i.e., one paging message 150 per each of the 12 possible eDRX cycles) to any given BSS 102₁ or 102₂ to be able to determine the next paging occasion for all of the wireless devices 104₁, 104₂, 104₃ . . . 104ₙ in all BSSs 102₁ and 102₂ with an accuracy of about 4 seconds or less (i.e., the maximum allowed variation in synchronization of each cell in the same Routing Area from a radio interface TDMA FN perspective).

A more detailed example is provided below:
1. Assume wireless device X: IMSIx=1234567890123456, wireless device Y: IMSIy=1234567890112233
2. The eDRX cycle value for wireless device X and wireless device Y=0100=104 (BS_ePA_MFRMS)

3. At time T1, the SGSN 107 transmits a paging message 150 (e.g., PAGING-PS PDU 150, DUMMY-PAGING-PS PDU 150) for wireless device X and receives TUNPOx=6 s.

It is to be noted that, from time T1 and onward, the SGSN 107 keeps track of the ongoing value of the 51-MF in progress and is thereby able to determine TUNPO for any other wireless device Y (for example) with the same eDRX cycle length for which the SGSN 107 receives downlink data 156 at any arbitrary point in time T2.

4. PG_MFx=1234567890123456 mod 104=96 (i.e., 51-MF 96 occurs 6 seconds after the SGSN 107 receives the page response message 152 for wireless device X at time T1)

5. PG_MFy=1234567890112233 mod 104=1

6. Diff (PG_MFx, PG_MFy)=9 (i.e., the nominal paging group for wireless device Y occurs nine 51-MF after the nominal paging group for wireless device X)->time diff=9*51-MF=9*235.38 ms=2.12 s 7. TUNPOy=TUNPOx-(time between time T1 and T2)+ 2.12 s=8.12 s (assuming time T1=T2)

Technique 3

In the third technique, the SGSN 107 (CN node 107) is first made aware of the current radio interface TDMA FN information applicable to the cells managed by any given BSS 102$_1$ or 102$_2$ (RAN node 102$_1$ or 102$_2$), which allows the SGSN 107 (CN node 107) to calculate the next paging opportunity for any wireless device 104$_1$, 104$_2$, 104$_3$ . . . 104$_n$ having any one of the twelve allowed eDRX cycle lengths. In one example, the SGSN 107 (CN 107) can be made aware of the current radio interface TDMA FN information by calculating the TDMA FN information from the GPS epoch information. In this particular example, the SGSN 107 relies on the fact that all cells managed by a given BSS 102$_1$ or 102$_2$ have the same understanding of when the same radio interface TDMA FN occurs. In other words, all cells use the same formula for calculating when frame number 0 occurs, and if a cell is restarted, it is restarted such that the frame numbering is consistent with when frame number 0 occurs for other cells managed by the same BSS 102$_1$ or 102$_2$. The time when frame number 0 occurs can be arbitrary as long as it is at least unique (consistent) within all cells in the same Routing Area. Ideally, the time when frame number 0 occurs is the same in all cells in all Routing Areas in order to enhance the paging success rate when wireless devices 104$_1$, 104$_2$, 104$_3$ . . . 104$_n$ move across Routing Area boundaries. In one specific version of this example, the frame numbering can be started with frame 0 on GPS epoch 00:00 UTC Jan. 6, 1980. The mapping formula between the GPS time and the nominal FN (one rollover of the week number from 1023 to 0 would have occurred in 1999) is then given by:

FN=[GPS Time MOD B] DIV K where

GPS Time=((GPS week+1024)*A+GPS second)

A=number of seconds in one week (604,800)

B=length of a hyperframe (12,533.76 seconds)

C=length of ¼ air symbol ($^{12}/_{13}$ microsecond)

K=length of frame ($^{60,000}/_{13}$ microseconds)

MOD=gives the reminder from the division

DIV=gives the integer part from the division

In another example, the SGSN 107 (CN node 107) can be made aware of the current radio interface TDMA FN information by transmitting to any given BSS 102$_1$ or 102$_2$ (RAN node 102$_1$ or 102$_2$) a paging message 150 (e.g., PAGING-PS PDU 150 or a DUMMY-PAGING-PS PDU 150) for an imaginary wireless device 104$x$ or a real wireless device 104$_1$, 104$_2$, 104$_3$ . . . 104$n$ and receiving a corresponding paging response 152 that has information therein that enables the SGSN 107 (CN node 107) to derive the radio interface timing information (i.e., Time Division Multiple Access (TDMA) frame number information) for the cells managed by the selected BSS 102$_2$ (RAN node 102$_2$). For example, the corresponding paging response 152 may have the TDMA FN value (range 0 to 2715647) currently being transmitted over the radio interface at the point where the paging response 152 is transmitted from the BSS 102$_2$ (RAN node 102$_2$) to the SGSN 107 (CN node 107).

Once the SGSN 107 (CN node 107) has the TDMA FN information, it is able to calculate the next paging opportunity for any wireless device 104$_1$, 104$_2$, 104$_3$ . . . 104$_n$ having any one of the twelve allowed eDRX cycle lengths. That is, once the SGSN 107 is aware of the current radio interface TDMA FN (applicable to all cells managed by any given BSS 102$_1$ or 102$_2$ in the Routing Area), the SGSN 107 can then calculate the TUNPO for any wireless device 104$_1$, 104$_2$, 104$_3$ . . . 104$_n$ having any one of the allowed eDRX cycle lengths. For example, since the SGSN 107 is aware of the current radio interface TDMA FN information applicable to the cells it manages, it knows the current 51-multiframe= (FN div 51)=X. The SGSN 107 can then calculate the number of 51-multiframes from the 51-multiframe X until the next instance of 51-multiframe=mod (div (IMSI, BS_C-C_CHANS), M) that occurs within the context of the negotiated eDRX cycle length for any wireless device 104$_1$, 104$_2$, 104$_3$ . . . 104$_n$. This calculation is known herein as the "time until the next paging occasion" (TUNPO) and can be translated into minutes and seconds since each 51-multiframe has a duration of 235.38 ms. In another example, the SGSN 107 with knowledge of the current TDMA FN value applicable on the radio interface allows the SGSN 107 to internally track the TDMA FN value as it progresses over time and determine when to page any given wireless device 104$_1$, 104$_2$, 104$_3$ . . . 104$_n$ using the teachings provided in 3GPP TS 45.002 V.13.2.0 (2016-06), which entail first performing the calculations in section 6.5.2b and then performing the calculations in section 6.5.3a which require knowledge of the TDMA FN value. The relevant sections and calculations from 3GPP TS 45.002 V.13.2.0 (the entire contents of which are hereby incorporated by reference herein for all purposes) are as follows:

Section 6.5.2b Determination of EC_CCCH_GROUP and PAGING_GROUP for MS in Idle Mode when Using Extended DRX Cycles for EC-GSM-IoT The EC-CCCH on which a MS will listen for paging messages and make random accesses is determined by EC_CCCH_GROUP, defined by:

EC_CCCH_GROUP (0 . . . EC_BS_CC_CHANS-1)= (I div M) mod EC_BS_CC_CHANS where

EC_BS_CC_CHANS=Number of EC-CCCHs, ranges from 1 to 4, broadcast in EC SI.

I=IMSI mod 10000000 (IMSI defined in 3GPP TS 23.003)

M=Number of 51-multiframes per negotiated eDRX Cycle=BS_ePA_MFRMS (see Table 6.5.6a.1)

The paging group is determined by the eDRX value and the downlink Coverage Class.

The 51-multiframe where the paging group occurs on the applicable EC_CCCH_GROUP is determined by:

EC_PAGING_GROUP_MF (0 . . . M-1)=I mod M

The paging group within the 51-multiframe is determined by:

EC_PAGING_GROUP_PCH (0 . . . L−1)=(I div (EC_B-S_CC_CHANS×M)) mod L
where
L=16 (number of CC1 paging groups per 51-multiframe)
The paging group within the negotiated eDRX cycle is derived by first assuming downlink Coverage Class 1 (CC1), irrespective of the downlink CC selected by the MS according to:
PAGING_GROUP_CC1 (0 . . . N−1)=L×EC_PAGING_GROUP_MF+EC_PAGING_GROUP_PCH
where
N=number of paging groups for CC1 on one EC-CCCH within a given eDRX cycle=BS_ePA_MFRMS×16 (see Table 6.5.6a-1).
In case the MS belongs to another downlink coverage class than CC1 (i.e., CC2, CC3 or CC4), the paging group shall be derived assuming that the physical resource of PAGING_GROUP_CC1 is contained within the physical resource of PAGING_GROUP for the downlink CC selected by the MS and is derived per Coverage Class according to the procedures below.
For CC1:
PAGING_GROUP (0 . . . M−1)=PAGING_GROUP_CC1
For CC2:
PAGING_GROUP (0 . . . M−1)=(PAGING_GROUP_CC1 div 4) mod 4+4×(PAGING_GROUP_CC1 div 32)
For CC3:
PAGING_GROUP (0 . . . M−1)=(PAGING_GROUP_CC1 div 8) mod 2+2×(PAGING_GROUP_CC1 div 32)
For CC4:
PAGING_GROUP (0 . . . M−1)=(PAGING_GROUP_CC1 div 8) mod 2+2×(PAGING_GROUP_CC1 div 64)
where
M=N div CC_DIV

TABLE 6.5.2-1

| CC_DIV. | | | |
|---|---|---|---|
| CC1 | CC2 | CC3 | CC4 |
| 1 | 8 | 16 | 32 |

The procedure for when the MS shall monitor the EC-CCCH is described in 3GPP TS 44.018.
For example, a MS that uses eDRX, where eDRX cycle value="0000" (BS_ePA_MFRMS=8) has been negotiated between the MS and the network (see Table 6.5.6a-1), and that belongs to CC4, will first derive PAGING_GROUP_CC1 according to mod (IMSI, 16×8). As a second step the PAGING_GROUP for the applicable downlink coverage class (CC4) is derived as (mod (IMSI, 16×8) div 8) mod 2+2*(mod (IMSI, 16×8) div 64).
Section 6.5.3 Determination of Specific Paging Multiframe and Paging Block Index
This sub-clause applies to the case where a MS is not using extended DRX cycles.
The required 51-multiframe occurs when:
PAGING_GROUP div (N div BS_PA_MFRMS)=(FN div 51) mod (BS_PA_MFRMS)
The index to the required paging block of the "available" blocks in the 51-multiframe:
Paging block index=PAGING_GROUP mod (N div BS_PA_MFRMS)
where the index is then used with the look-up table 5 of clause 7 to determine the actual paging channel interleaved block to be monitored.
In GPRS non-DRX mode, the MS shall listen to all blocks of the CCCH channel.
Section 6.5.3a Determination of Specific Paging Multiframe and Paging Block Index for EC-GSM-IoT
6.5.3a.1 CC1
The 51-multiframe where the paging block is mapped for CC1 occurs when:
PAGING_GROUP div 16=(RFN$_{QH}$ div 51) mod (BS_e-PA_MFRMS)
where
RFN$_{QH}$ is the TDMA frame number known with an accuracy of a quarter hyperframe (see sub-clause 3.3.2.2.3)
The index to the required paging block of the "available" blocks in the 51-multiframe:
Paging block index=PAGING_GROUP mod 16
where the index is then used with the look-up table 6a of clause 7 (also illustrated in FIG. 13) to determine the actual paging channel interleaved block to be monitored.
In these calculations, since the SGSN 107 will have knowledge of the ongoing TDMA FN value, the SGSN 107 will necessarily have knowledge of RFN$_{QH}$ referred to in section 6.5.3a.1 above. Thus, after performing the calculations of sections 6.5.2b and 6.5.3a, the SGSN 107 will know the specific TDMA FN (or set of TDMA FNs) in which the SGSN 107 needs to transmit a page for any given wireless device 104$_1$, 104$_2$, 104$_3$ . . . 104$_n$ having any IMSI+eDRX cycle+coverage class. Since, the SGSN 107 also knows when that TDMA FN (set of TDMA FNs) will occur in real time, the SGSN 107 can determine upon receiving downlink payload 156 (N-PDUs 156) for any given wireless device 104$_1$, 104$_2$, 104$_3$ . . . 104$_n$ when the SGSN 107 should transmit a paging message 150' for the given wireless device 104$_1$, 104$_2$, 104$_3$ . . . 104$_n$ to the appropriate set of BSSs 102$_1$ or 102$_2$.
Basic Functionalities-Configurations of CN Node 107 Implementing Techniques 1, 2, and 3
Referring to FIG. 3, there is a flowchart of a method 300 (technique 1) implemented in the CN node 107 (e.g., SGSN 107) configured to interact with a RAN node (e.g., one of RAN nodes 102$_1$ and 102$_2$) managing cells in a routing area in accordance with an embodiment of the present disclosure. The CN node 107 is configured to determine a reachability of a plurality of wireless devices 104$_1$, 104$_2$, 104$_3$ . . . 104$_n$ in eDRX operation. At step 302, the CN node 107 transmits, to the RAN node 102$_1$ or 102$_2$, at time T1 a paging message 150 (e.g., PAGING-PS PDU 150, DUMMY-PAGING-PS PDU 150) associated with a selected wireless device 140x (or one of the real wireless devices 104$_1$, 104$_2$, 104$_3$ . . . 104$_n$). For example, the selected wireless device 140x (for example) would have a longest eDRX cycle of a plurality of possible eDRX cycles (twelve possible eDRX cycles) and have an IMSI selected to have a corresponding nominal paging group that maps to a first or last 51 MF in each quarter hyperframe 202a, 202b, 202c and 202d of a hyperframe 200. At step 304, the CN node 107 receives, from the RAN node 102$_1$ or 102$_2$, a paging response message 152 which includes a time remaining until a next paging occasion (TUNPO) for the selected wireless device 140x relative to time T 1. At step 306, at time T2 the CN node 107 receives a payload 156 (N-PDU 156) for one of the plurality of wireless devices $104_1$, $104_2$, $104_3$ ... $104_n$ which is using any one of the twelve eDRX cycles. At step 308, the CN node 107 calculates a time remaining until a next paging occasion (TUNPO) for the one of the plurality of wireless devices $104_1$, $104_2$, $104_3$ ... $104_n$ by utilizing the time remaining until a next paging occasion (TUNPO) for the selected wireless device 140*x* relative to time T1. For example, the CN node 107 can calculate the time remaining until a next paging occasion (TUNPO) for the one of the plurality of wireless devices $104_1$, $104_2$, $104_3$ ... $104_n$ relative to time T2 by: (1) determining a 51-MF within a quarter hyper frame 202*a* in progress on a radio interface to the cells at a point (T1) where the paging message 150 was transmitted to the RAN node $102_1$ or $102_2$ (step 308*a*); (2) tracking a progression of 51 MFs in the quarter hyper frame 202*a* in progress and in subsequent quarter hyper frames 202*b*, 202*c* and 202*d* using the determined 51-MF (step 308*b*); (3) calculating a 51-MF at time (T2) when receiving the payload 156 for the one of the plurality of wireless devices wherein the calculated 51-MF indicates the 51-MF in which the next instance of a paging group occurs for the one of the plurality of wireless devices with respect to the eDRX cycle used by the one of the plurality of wireless devices (step 308*c*); and (4) calculating the time until the next instance of a paging group for the one of the plurality of wireless devices (step 308*d*). For example, the CN node 107 can calculate the time until the next instance of a paging group for the one of the plurality of wireless devices as follows:

Determine with respect to the time T2 the current value of the tracked 51-MF (step 308*d*1).

Identify with respect to the time T2 the value of the 51-MF corresponding to the next instance of a paging group for the one of the plurality of wireless devices with respect to the eDRX cycle used by the one of the plurality of wireless devices (step 308*d*2). The next instance of a paging group for the one of the plurality of wireless devices=mod (div (IMSI, BS_C-C_CHANS), M)=(FN div 51) mod (BS_ePA_M-FRMS).

Determine the value of the tracked 51-MF that corresponds to the 51-MF identified for the next instance of a paging group for the one of the plurality of wireless devices (step 308*d*3). This is done by realizing the tracked 51-MF has a range of 0 to 13311 (the maximum eDRX cycle length) whereas the range of the 51-MF corresponding to the one of the plurality of wireless devices will be a subset of the range 0 to 13311 (e.g., if the one of the plurality of wireless devices uses the $4^{th}$ lowest eDRX cycle then the range of 51-MF for the $4^{th}$ lowest eDRX cycle will be 0 to 51 which repeats 256 times within the set of 13312 51-MF comprising the longest eDRX cycle).

Determine when the value of the tracked 51-MF corresponds to the 51-MF identified for the next instance of a paging group for the one of the plurality of wireless devices occurs within an allowable range (step 308*d*4) (e.g., the current value for the tracked 51-MF is 30 to 40 51-MF less than the tracked 51-MF that corresponds to the next instance of a paging group for the one of the plurality of wireless devices), then the CN node 107 performs the transmit step 310.

At step 310, the CN node 107 transmits, to at least the RAN node $102_1$ or $102_2$ (in some embodiments, to the one or more RAN nodes $102_1$ and $102_2$), another paging message 150' associated with the one of the plurality of wireless devices $104_1$, $104_2$, $104_3$ ... $104_n$, wherein the another paging message 150' is transmitted a predetermined time before the next instance of the paging group for the one of the plurality of wireless devices $104_1$, $104_2$, $104_3$ ... $104_n$ (i.e., the tracked 51-MF has a value that is within an allowable range prior to the value of the 51-MF corresponding to next instance of a paging group for the one of the plurality of wireless devices $104_1$, $104_2$, $104_3$ ... $104_n$). Further, the CN node 107 is operable to repeat the receiving step 306, the calculating step 308, and the transmitting step 310 for any one of the remaining ones of the plurality of wireless devices $104_1$, $104_2$, $104_3$ ... $104_n$ having any one of the twelve eDRX cycles for which downlink payload 156 (N-PDU 156) has been received. The CN node 107 does not need to repeat the transmit step 302 or the receive step 304 to calculate (i.e., the calculate step 308) the time remaining until a next paging occasion (TUNPO) for any one of the remaining ones of the plurality of wireless devices $104_1$, $104_2$, $104_3$ ... $104_n$ having any one of the twelve eDRX cycles.

Figure 4:
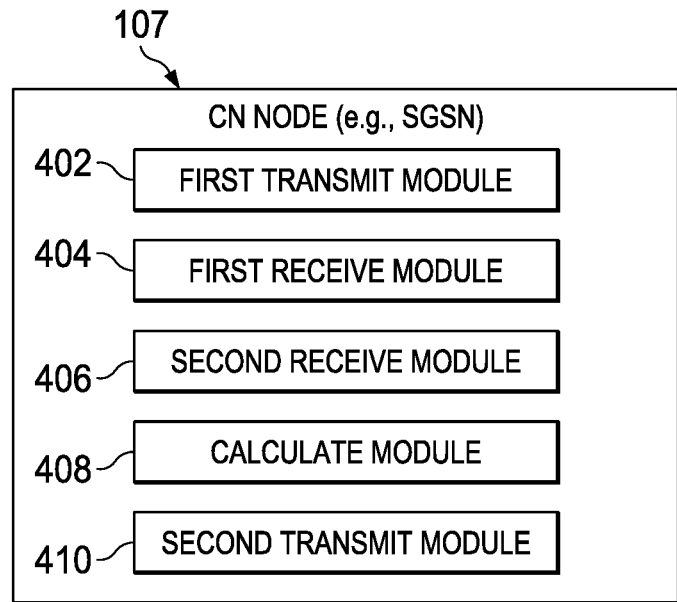
FIG. 4 is a block diagram illustrating a structure of the CN node configured to implement the method (technique 1) in accordance with an embodiment of the present disclosure.

Referring to FIG. 4, there is a block diagram illustrating structures of an exemplary CN node 107 (e.g., SGSN 107) which interacts with a RAN node (e.g., one of RAN nodes $102_1$ and $102_2$) managing cells in a routing area in accordance with an embodiment of the present disclosure. The CN node 107 is configured to determine a reachability of a plurality of wireless devices $104_1$, $104_2$, $104_3$ ... $104_n$ in eDRX operation. In one embodiment, the CN node 107 comprises a first transmit module 402, a first receive module 404, a second receive module 406, a calculate module 408, and a second transmit module 410. The first transmit module 402 is configured to transmit, to the RAN node $102_1$ or $102_2$, a paging message 150 (e.g., PAGING-PS PDU 150, DUMMY-PAGING-PS PDU 150) associated with a selected wireless device 140*x* (or one of the real wireless devices $104_1$, $104_2$, $104_3$ ... $104_4$ For example, the selected wireless device 140*x* (for example) would have a longest eDRX cycle of a plurality of eDRX cycles (twelve eDRX cycles are possible) and have an IMSI selected to have a corresponding nominal paging group that maps to a first or last 51 MF in each quarter hyperframe 202*a*, 202*b*, 202*c* and 202*d* of a hyperframe 200. The first receive module 404 is configured to receive, from the RAN node $102_1$ or $102_2$, a paging response message 152 which includes a time remaining until a next paging occasion (TUNPO) for the selected wireless device 140*x*. The second receive module 406 is configured to receive a payload 156 (N-PDU 156) for one of the plurality of wireless devices $104_1$, $104_2$, $104_3$ ... $104_n$ which is using any one of the twelve eDRX cycles. The calculate module 408 is configured to calculate a time remaining until a next paging occasion (TUNPO) for the one of the plurality of wireless devices $104_1$, $104_2$, $104_3$ ... $104_n$ by utilizing the time remaining until a next paging occasion (TUNPO) for the selected wireless device 140*x*. For example, the calculate module 408 can calculate the time remaining until a next paging occasion (TUNPO) for the one of the plurality of wireless devices $104_1$, $104_2$, $104_3$ ... $104_n$ by: (1) determining a 51-MF within a quarter hyper frame 202*a* in progress on a radio interface to the cells at a point (T1) where the paging message 150 was transmitted to the RAN node $102_1$ or $102_2$; (2) tracking a progression of 51 MFs in the quarter hyper frame 202*a* in progress and in subsequent quarter hyper frames 202*b*, 202*c* and 202*d* using the determined 51-MF; (3) calculating a 51 MF at time (T2) when the payload 156 for the one of the plurality of wireless devices is received; and (4) calculating the time until the next instance of a paging group for the one of the plurality of wireless devices (see discussion above with respect to FIG.

3's step 308 for more details on how the calculate module 408 can calculate the TUNPO for the one of the plurality of wireless devices $104_1$, $104_2$, $104_3$ . . . $104_4$ The second transmit module 410 is configured to transmit, to at least the RAN node $102_1$ or $102_2$ (in some embodiments, to the one or more RAN nodes $102_1$ and $102_2$), another paging message 150' associated with the one of the plurality of wireless devices $104_1$, $104_2$, $104_3$ . . . $104_n$ wherein the another paging message 150' is transmitted a predetermined time before the next instance of the paging group for the one of the plurality of wireless devices $104_1$, $104_2$, $104_3$ . . . $104_n$ (i.e., the tracked 51-MF has a value that is within an allowable range prior to the value of the 51-MF corresponding to next instance of a paging group for the one of the plurality of wireless devices $104_1$). Further, the second receiving module 406, the calculate module 408, and the second transmit module 410 can repeat their operations for any one of the remaining ones of the plurality of wireless devices $104_1$, $104_2$, $104_3$ . . . $104_n$ having any one of the twelve eDRX cycles for which downlink payload 156 (N-PDU 156) has been received. The first transmit module 402 and the first receive module 404 do not need to repeat their operations in order for the CN node 107 to calculate (i.e., by the calculate module 408) the time remaining until a next paging occasion (TUNPO) for any one of the remaining ones of the plurality of wireless devices $104_1$, $104_2$, $104_3$ . . . $104_n$ having any one of the twelve eDRX cycles. In addition, it should be noted that the CN node 107 may also include other components, modules or structures which are well-known, but for clarity, only the components, modules or structures needed to describe the features of the present disclosure are described herein.

As those skilled in the art will appreciate, the above-described modules 402, 404, 406, 408, and 410 of the CN node 107 may be implemented separately as suitable dedicated circuits. Further, the modules 402, 404, 406, 408, and 410 can also be implemented using any number of dedicated circuits through functional combination or separation. In some embodiments, the modules 402, 404, 406, 408, and 410 may be even combined in a single application specific integrated circuit (ASIC). As an alternative software-based implementation, the CN node 107 may comprise a memory 148, a processor 146 (including but not limited to a microprocessor, a microcontroller or a Digital Signal Processor (DSP), etc.) and a transceiver 136. The memory 148 stores machine-readable program code executable by the processor 146 to cause the CN node 107 to perform the steps of the above-described method 300.

Figure 5:
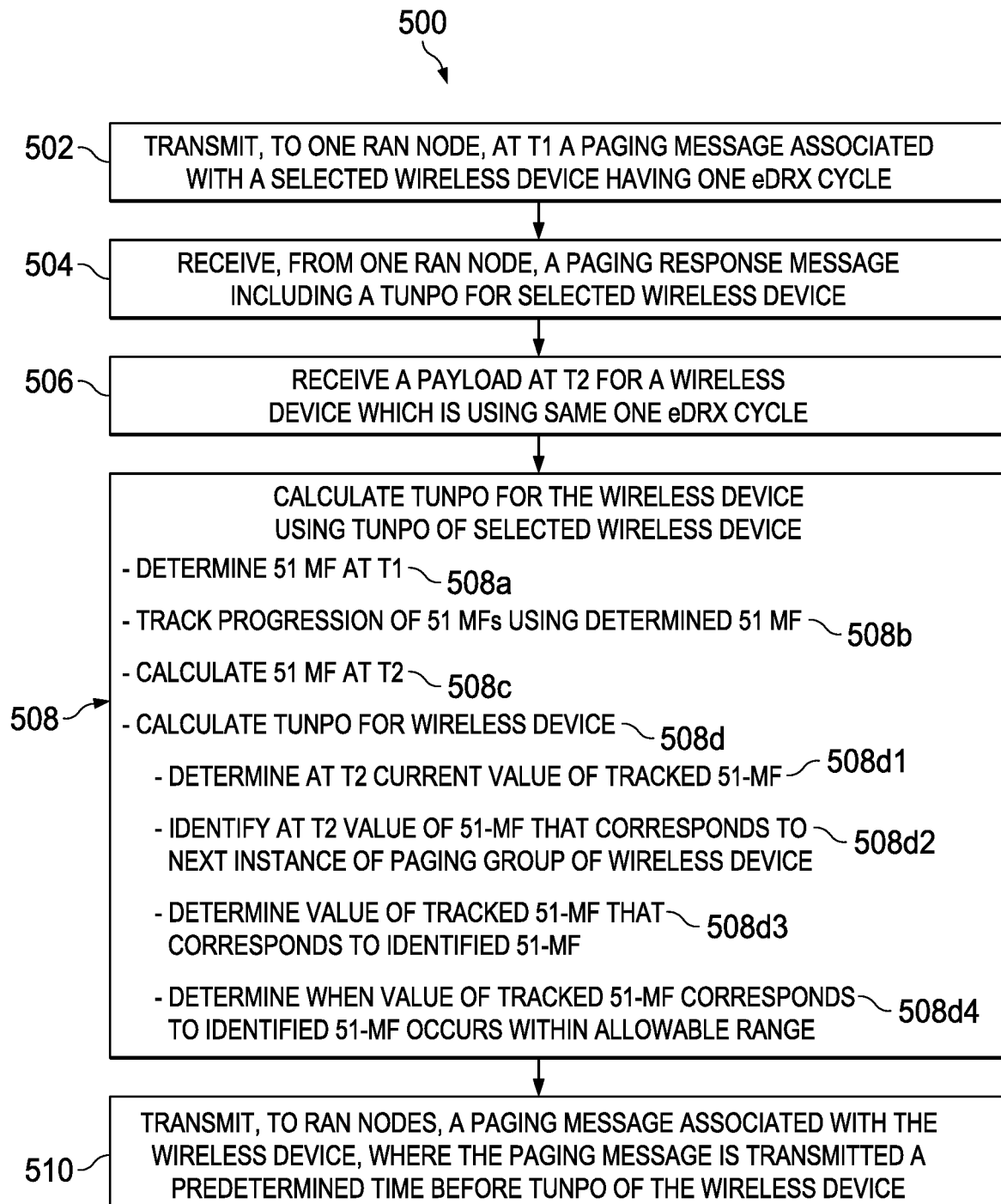
FIG. 5 is a flowchart of a method (technique 2) implemented in the CN node in accordance with an embodiment of the present disclosure.

Referring to FIG. 5, there is a flowchart of a method 500 (technique 2) implemented in the CN node 107 (e.g., SGSN 107) configured to interact with a RAN node (e.g., one of RAN nodes $102_1$ and $102_2$) managing cells in a routing area in accordance with an embodiment of the present disclosure. The CN node 107 is configured to determine a reachability of a plurality of wireless devices $104_1$, $104_2$, $104_3$ . . . $104_n$ in eDRX operation. At step 502, at time T1 the CN node 107 transmits, to the RAN node $102_1$ or $102_2$, a paging message 150 (e.g., PAGING-PS PDU 150, DUMMY-PAGING-PS PDU 150) associated with a wireless device $104_3$ (for example) selected from a plurality of real wireless devices $104_1$, $104_2$, $104_3$ . . . $104_n$. For example, the selected wireless device $104_3$ uses one eDRX cycle of the plurality of possible eDRX cycles (12 possible eDRX cycles) and has an IMSI that has a corresponding nominal paging group that maps to a specific 51 MF in each of a plurality of instances of the one eDRX cycle. At step 504, the CN node 107 receives, from the RAN node $102_1$ or $102_2$, a paging response message 152 which includes a time remaining until a next paging occasion (TUNPO) for the selected wireless device $104_3$ relative to time T1. At step 506, at time T2 the CN node 107 receives a payload 156 (N-PDU 156) for one of the plurality of wireless devices $104_1$, $104_2$, $104_3$ . . . $104_n$ which is using the same one of the plurality of eDRX cycles (i.e., both the selected wireless device $104_3$ and the one of the plurality of wireless devices $104_1$, $104_2$, $104_3$ . . . $104_n$ use the same eDRX cycle). At step 508, the CN node 107 calculates a time remaining until a next paging occasion (TUNPO) for the one of the plurality of wireless devices $104_1$, $104_2$, $104_3$ . . . $104_n$ by utilizing the time remaining until a next paging occasion (TUNPO) for the selected wireless device $104_3$ relative to time T1. For example, the CN node 107 can calculate the time remaining until a next paging occasion for the one of the plurality of wireless devices $104_1$, $104_2$, $104_3$ . . . $104_n$ relative to time T2 by: (1) determining a 51-MF within a quarter hyper frame 202a in progress on a radio interface to the cells at a point (T1) where the paging message 150 was transmitted to the RAN node $102_1$ or $102_2$ (step 508a); (2) tracking a progression of 51 MFs in the quarter hyper frame 202a in progress and in subsequent quarter hyper frames 202b, 202c and 202d using the determined 51-MF (step 508b); (3) calculating a 51-MF at time (T2) when receiving the payload 156 for the one of the plurality of wireless devices wherein the calculated 51-MF indicates the 51-MF in which the next instance of a paging group occurs for the one of the plurality of wireless devices with respect to the eDRX cycle used by the one of the plurality of wireless devices (step 508c); and (4) calculating the time until the next instance of a paging group for the one of the plurality of wireless devices (step 508d). For example, the CN node 107 can calculate the time until the next instance of a paging group for the one of the plurality of wireless devices as follows:

Determine with respect to the time T2 the current value of the tracked 51-MF (step 508d1).

Identify with respect to the time T2 the value of the 51-MF corresponding to the next instance of a paging group for the one of the plurality of wireless devices with respect to the eDRX cycle used by the one of the plurality of wireless devices (step 508d2). The next instance of a paging group for the one of the plurality of wireless devices=mod (div (IMSI, BS_C-C_CHANS), M)=(FN div 51) mod (BS_ePA_M-FRMS).

Determine the value of the tracked 51-MF that corresponds to the 51-MF identified for the next instance of a paging group for the one of the plurality of wireless devices (step 508d3). This is done by realizing the tracked 51-MF has the same range as the 51-MF corresponding to the one of the plurality of wireless devices (e.g., if the one of the plurality of wireless devices uses the $4^{th}$ lowest eDRX cycle then the range of 51-MF for the $4^{th}$ lowest eDRX cycle will be 0 to 51 which repeats 256 times within the set of 13312 51-MF comprising the longest eDRX cycle).

Determine when the value of the tracked 51-MF that corresponds to the 51-MF identified for the next instance of a paging group for the one of the plurality of wireless devices occurs within an allowable range (step 508d4) (e.g., the current value for the tracked 51-MF is 30 to 40 51-MF less than the tracked 51-MF that corresponds to the next instance of a paging group for the one of the plurality of wireless devices), then the CN node 107 performs the transmit step 510.

At step 510, the CN node 107 transmits, to at least the RAN node 102₁ or 102₂ (in some embodiments, to the one or more RAN nodes 102₁ and 102₂), another paging message 150' associated with the one of the plurality of wireless devices 104₁, 104₂, 104₃ . . . 104ₙ, wherein the another paging message 150' is transmitted a predetermined time before the next instance of the paging group for the one of the plurality of wireless devices 104₁, 104₂, 104₃ . . . 104ₙ (i.e., the tracked 51-MF has a value that is within an allowable range prior to the value of the 51-MF corresponding to next instance of a paging group for the one of the plurality of wireless devices 104₁). Further, the CN node 107 is operable to repeat the transmitting step 502 and the receiving step 504 for additional wireless devices (i.e., 11 wireless devices) selected from the plurality of wireless devices 104₁, 104₂, 104₃ . . . 104ₙ which are using each of the remaining eDRX cycles (i.e., 11 eDRX cycles) of the plurality of eDRX cycles (i.e., 12 eDRX cycles) (i.e., the CN node 107 would perform the transmitting step 502 and the receiving step 504 for a total of 12 times to correspond to the twelve eDRX cycles). The CN node 107 would repeat the receiving step 506, the calculating step 508, and the transmitting step 510 as needed when receiving payload 156 (N-PDU 156) for other ones of the plurality of wireless devices 104₁, 104₂, 104₃ . . . 104ₙ using one of the plurality of eDRX cycles (i.e., the CN node 107 would use the obtained TUNPO for one wireless device using a certain eDRX cycle per steps 502 and 504 and then repeat steps 506, 508, and 510 for any of the other wireless devices using the same certain eDRX cycle).

Figure 6:
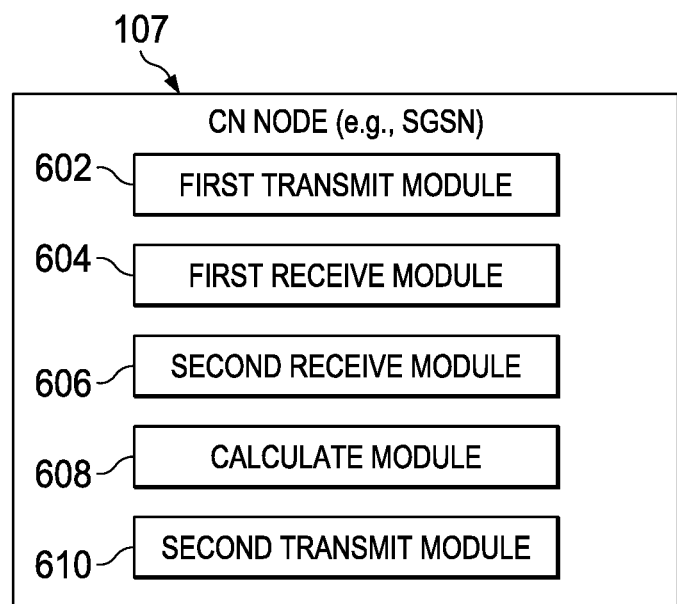
FIG. 6 is a block diagram illustrating a structure of the CN node configured to implement the method (technique 2) in accordance with an embodiment of the present disclosure.

Referring to FIG. 6, there is a block diagram illustrating structures of an exemplary CN node 107 (e.g., SGSN 107) which interacts with a RAN node (e.g., one of RAN nodes 102₁ and 102₂) managing cells in a routing area in accordance with an embodiment of the present disclosure. The CN node 107 is configured to determine a reachability of a plurality of wireless devices 104₁, 104₂, 104₃ . . . 104ₙ in eDRX operation. In one embodiment, the CN node 107 comprises a first transmit module 602, a first receive module 604, a second receive module 606, a calculate module 608, and a second transmit module 610. The first transmit module 602 is configured to transmit, to the RAN node 102₁ or 102₂, a paging message 150 (e.g., PAGING-PS PDU 150, DUMMY-PAGING-PS PDU 150) associated with a wireless device 104₃ (for example) selected from a plurality of real wireless devices 104₁, 104₂, 104₃ . . . 104ₙ. For example, the selected wireless device 104₃ uses one eDRX cycle of the plurality of eDRX cycles (12 eDRX cycles are possible) and has an IMSI that has a corresponding nominal paging group that maps to a specific 51 MF in each of a plurality of instances of the one eDRX cycle. The first receive module 604 is configured to receive, from the RAN node 102₁ or 102₂, a paging response message 152 which includes a time remaining until a next paging occasion (TUNPO) for the selected wireless device 104₃. The second receive module 606 is configured to receive a payload 156 (N-PDU 156) for one of the plurality of wireless devices 104₁, 104₂, 104₃ . . . 104ₙ which is using the same one of the plurality of eDRX cycles (i.e., both the selected wireless device 104₃ and the one of the plurality of wireless devices 104₁, 104₂, 104₃ . . . 104ₙ use the same eDRX cycle). The calculate module 608 is configured to calculate a time remaining until a next paging occasion (TUNPO) for the one of the plurality of wireless devices 104₁, 104₂, 104₃ . . . 104ₙ by utilizing the time remaining until a next paging occasion (TUNPO) for the selected wireless device 104₃. For example, the CN node 107 can calculate the time remaining until a next paging occasion for the one of the plurality of wireless devices 104₁, 104₂, 104₃ . . . 104ₙ by: (1) determining a 51-MF within a quarter hyper frame 202a in progress on a radio interface to the cells at a point (T1) where the paging message 150 was transmitted to the RAN node 102₁ or 102₂; (2) tracking a progression of 51 MFs in the quarter hyper frame 202a in progress and in subsequent quarter hyper frames 202b, 202c and 202d using the determined 51-MF; (3) calculating a 51 MF at time (T2) when the payload 156 for the one of the plurality of wireless devices is received; and (4) calculating the time until the next instance of a paging group for the one of the plurality of wireless devices (see discussion above related to FIG. 5's step 508 for more details on how the calculate module 608 can calculate the TUNPO for the one of the plurality of wireless devices 104₁, 104₂, 104₃ . . . 104₄. The second transmit module 610 is configured to transmit, to at least the RAN node 102₁ or 102₂ (in some embodiments, to the one or more RAN nodes 102₁ and 102₂), another paging message 150' associated with the one of the plurality of wireless devices 104₁, 104₂, 104₃ . . . 104ₙ, wherein the another paging message 150' is transmitted a predetermined time before the next instance of the paging group for the one of the plurality of wireless devices 104₁, 104₂, 104₃ . . . 104ₙ (i.e., the tracked 51-MF has a value that is within an allowable range prior to the value of the 51-MF corresponding to next instance of a paging group for the one of the plurality of wireless devices 104₁). Further, the first transmit module 602 and the first receive module 604 are configured to repeat their operations for additional wireless devices (i.e., 11 wireless devices) selected from the plurality of wireless devices 104₁, 104₂, 104₃ . . . 104ₙ which are using each of the remaining eDRX cycles (i.e., 11 eDRX cycles) of the plurality of eDRX cycles (i.e., 12 eDRX cycles) (i.e., the first transmit module 602 and the first receive module 604 would repeat their operations for a total of 12 times to correspond to the twelve eDRX cycles). The second receive module 606, the calculate module 608, and the second transmit module 610 will repeat their operations as needed when payload 156 (N-PDU 156) is received for other ones of the plurality of wireless devices 104₁, 104₂, 104₃ . . . 104ₙ using one of the plurality of eDRX cycles (i.e., the CN node 107 would use the obtained TUNPO for one wireless device using a certain eDRX cycle obtained by modules 602 and 604 and then have modules 606, 608, and 610 repeat their operations for any of the other wireless devices using the same certain eDRX cycle). In addition, it should be noted that the CN node 107 may also include other components, modules or structures which are well-known, but for clarity, only the components, modules or structures needed to describe the features of the present disclosure are described herein.

As those skilled in the art will appreciate, the above-described modules 602, 604, 606, 608, and 610 of the CN node 107 may be implemented separately as suitable dedicated circuits. Further, the modules 602, 604, 606, 608, and 610 can also be implemented using any number of dedicated circuits through functional combination or separation. In some embodiments, the modules 602, 604, 606, 608, and 610 may be even combined in a single application specific integrated circuit (ASIC). As an alternative software-based implementation, the CN node 107 may comprise a memory 148, a processor 146 (including but not limited to a microprocessor, a microcontroller or a Digital Signal Processor (DSP), etc.) and a transceiver 136. The memory 148 stores machine-readable program code executable by the processor 146 to cause the CN node 107 to perform the steps of the above-described method 500.

Figure 7:
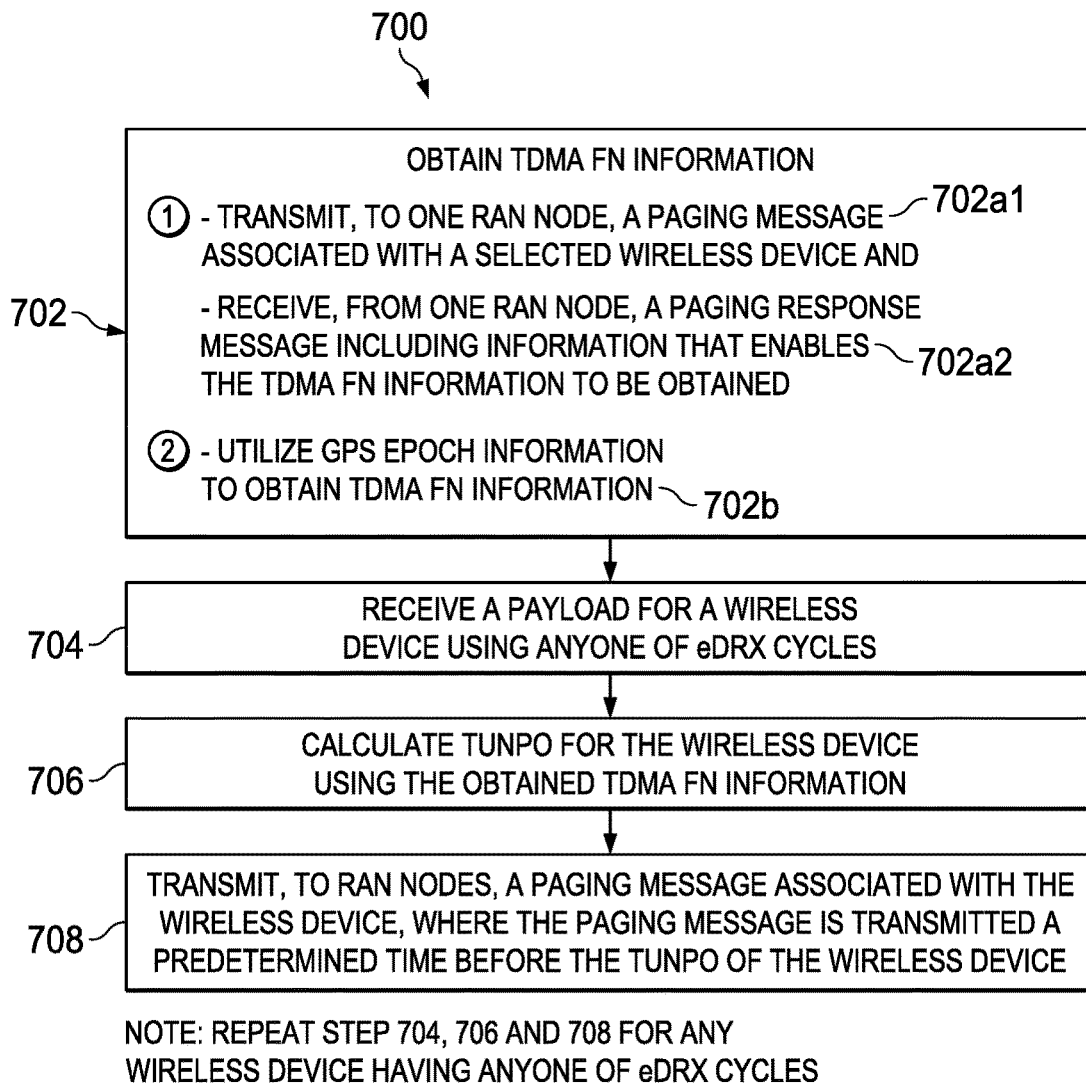
FIG. 7 is a flowchart of a method (technique 3) implemented in the CN node in accordance with an embodiment of the present disclosure; and, FIG. 8 is a block diagram illustrating a structure of the CN node configured to implement the method (technique 3) in accordance with an embodiment of the present disclosure.

Referring to FIG. 7, there is a flowchart of a method 700 (technique 3) implemented in the CN node 107 (e.g., SGSN 107) configured to interact with one or more RAN nodes $102_1$ and $102_2$ managing cells in a routing area in accordance with an embodiment of the present disclosure. The CN node 107 is configured to determine a reachability of a plurality of wireless devices $104_1$, $104_2$, $104_3$ . . . $104_n$ in eDRX operation. At step 702, the CN node 107 obtains radio interface TDMA FN information applicable to the cells managed by any one of the one or more RAN nodes $102_1$ and $102_2$. In one example, the CN node 107 can obtain the TDMA FN information by: (1) transmitting, to one of the RAN nodes $102_1$ or $102_2$, a paging message 150 (e.g., PAGING-PS PDU 150, DUMMY-PAGING-PS PDU 150) associated with a selected wireless device 140x (or one of the real wireless devices $104_1$, $104_2$, $104_3$ . . . $104_n$) using any one of the eDRX cycles (step 702a1); and (2) receive, from the one RAN node $102_1$ or $102_2$, a paging response message 152 which includes information that enables the CN node to derive the TDMA FN information (step 702a2). In another example, the CN node 107 can obtain the TDMA FN information by utilizing Global Positioning System epoch information to calculate the TDMA FN information (step 702b). At step 704, the CN node 107 receives a payload 156 (N-PDU 156) for one of the plurality of wireless devices $104_1$, $104_2$, $104_3$ . . . $104_n$ which is using any one of the plurality of eDRX cycles. At step 706, the CN node 107 calculates a time remaining until a next paging occasion (TUNPO) for the one of the plurality of wireless devices $104_1$, $104_2$, $104_3$ . . . $104_n$ by utilizing the obtained TDMA FN information (see detailed discussion above). At step 708, the CN node 107 transmits, to the one or more RAN nodes $102_1$ and $102_2$, a paging message 150' associated with the one of the plurality of wireless devices $104_1$, $104_2$, $104_3$ . . . $104_n$, wherein the paging message 150' is transmitted a predetermined time before the next instance of the paging group for the one of the plurality of wireless devices $104_1$, $104_2$, $104_3$ . . . $104_n$ (i.e., the CN node 107 uses its knowledge of TDMA FN information to ensure the paging message 150' is transmitted within an allowable time prior to the next instance of a paging group for the one of the plurality of wireless devices $104_1$, $104_2$, $104_3$ . . . $104_n$). Further, the CN node 107 is operable to repeat the receiving step 704, the calculating step 706, and the transmitting step 708 for any one of the remaining ones of the plurality of wireless devices $104_1$, $104_2$, $104_3$ . . . $104_n$ having any one of the twelve eDRX cycles for which downlink payload 156 (N-PDU 156) has been received. The CN node does not need to repeat the obtain step 702 to calculate the time remaining until a next paging occasion (TUNPO) for any one of the remaining ones of the plurality of wireless devices $104_1$, $104_2$, $104_3$ . . . $104_n$ having any one of the twelve eDRX cycles.

Figure 8:
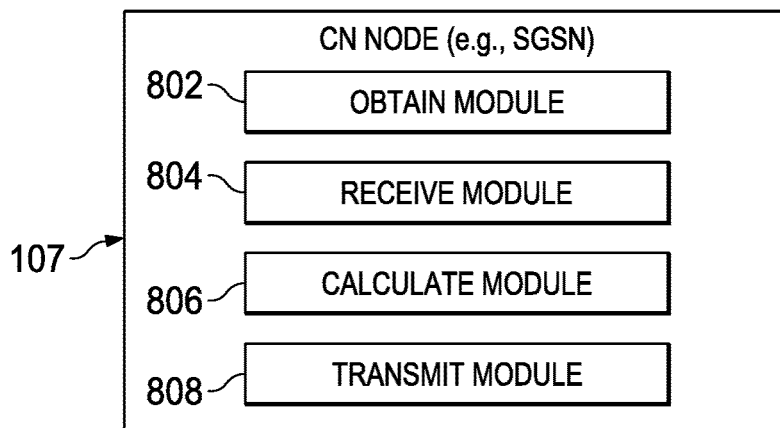

Referring to FIG. 8, there is a block diagram illustrating structures of an exemplary CN node 107 (e.g., SGSN 107) which interacts with one or more RAN nodes $102_1$ and $102_2$ managing cells in a routing area in accordance with an embodiment of the present disclosure. The CN node 107 is configured to determine a reachability of a plurality of wireless devices $104_1$, $104_2$, $104_3$ . . . $104_n$ in eDRX operation. In one embodiment, the CN node 107 comprises an obtain module 802, a receive module 804, a calculate module 806, and a transmit module 808. The obtain module 802 is configured to obtain radio interface TDMA FN information applicable to the cells managed by any one of the one or more RAN nodes $102_1$ and $102_2$. In one example, the obtain module 802 can obtain the TDMA FN information by: (1) transmitting, to one of the RAN nodes $102_1$ or $102_2$, a paging message 150 (e.g., PAGING-PS PDU 150, DUMMY-PAGING-PS PDU 150) associated with a selected wireless device 140x (or one of the real wireless devices $104_1$, $104_2$, $104_3$ . . . $104_n$) using any one of the eDRX cycles; and (2) receive, from the one RAN node $102_1$ or $102_2$, a paging response message 152 which includes information which enables the CN node to derive the TDMA FN information. In another example, the obtain module 802 can obtain the TDMA FN information by utilizing Global Positioning System epoch information to calculate the TDMA FN information. The receive module 804 is configured to receive a payload 156 (N-PDU 156) for one of the plurality of wireless devices $104_1$, $104_2$, $104_3$ . . . $104_n$ which is using any one of the plurality of eDRX cycles. The calculate module 806 is configured to calculate a time remaining until a next paging occasion (TUNPO) for the one of the plurality of wireless devices by utilizing the obtained TDMA FN information (see detailed discussion above). The transmit module 808 is configured to transmit, to the one or more RAN nodes $102_1$ and $102_2$, a paging message 150' associated with the one of the plurality of wireless devices $104_1$, $104_2$, $104_3$ . . . $104_n$, wherein the paging message 150' is transmitted a predetermined time before the next instance of the paging group for the one of the plurality of wireless devices $104_1$, $104_2$, $104_3$ . . . 104n (i.e., the CN node 107 uses its knowledge of TDMA FN information to ensure the paging message 150' is transmitted within an allowable time prior to the next instance of a paging group for the one of the plurality of wireless devices $104_1$, $104_2$, $104_3$ . . . $104_4$ Further, the receive module 804, the calculate module 806, and the transmit module 808 are configured to repeat their respective operations for any one of the remaining ones of the plurality of wireless devices $104_1$, $104_2$, $104_3$ . . . $104_n$ having any one of the twelve eDRX cycles for which downlink payload 156 (N-PDU 156) has been received. In addition, it should be noted that the CN node 107 may also include other components, modules or structures which are well-known, but for clarity, only the components, modules or structures needed to describe the features of the present disclosure are described herein.

As those skilled in the art will appreciate, the above-described modules 802, 804, 806, and 808 of the CN node 107 may be implemented separately as suitable dedicated circuits. Further, the modules 802, 804, 806, and 808 can also be implemented using any number of dedicated circuits through functional combination or separation. In some embodiments, the modules 802, 804, 806, and 808 may be even combined in a single application specific integrated circuit (ASIC). As an alternative software-based implementation, the CN node 107 may comprise a memory 148, a processor 146 (including but not limited to a microprocessor, a microcontroller or a Digital Signal Processor (DSP), etc.) and a transceiver 136. The memory 148 stores machine-readable program code executable by the processor 146 to cause the CN node 107 to perform the steps of the above-described method 700.

The techniques described herein are applicable to any Radio Access Technology (RAT), wherein the controlling core network node (e.g., SGSN, Mobility Management Entity (MME), or similar) needs to know when the paging opportunity occurs on the radio interface, wherein the RAN node (e.g., Base Station System (BSS), Node B (Nb), evolved Nb (eNb), or similar), during active data transfer, provides the controlling core network nodes with timing information of the radio interface, and/or wherein the information to calculate the radio interface timing is provided by the controlling core network node. It is further to be noted that the information needed to determine the radio interface timing may vary from system to system, and thus, may be solution dependent.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A core network (CN) node configured to interact with a radio access network (RAN) node managing cells in a routing area, the CN node comprising:
   a processor; and,
   a memory that stores processor-executable instructions, wherein the processor interfaces with the memory to execute the processor-executable instructions, whereby the CN node is operable to:
      transmit, to the RAN node, a first paging message associated with a first selected wireless device from a plurality of wireless devices using one Extended Discontinuous Receive (eDRX) cycle of a plurality of eDRX cycles;
      receive, from the RAN node, a first paging response message which includes a time remaining until a next paging occasion for the first selected wireless device;
      receive a payload for one of the plurality of wireless device using the one eDRX cycle of the plurality of eDRX cycles;
      calculate a time remaining until a next paging occasion for the one of the plurality of wireless devices by utilizing the time remaining until a next paging occasion for the first selected wireless device, wherein the CN node is further operable to perform the calculate operation as follows:
      determine a 51-multiframe (MF) within a quarter hyper frame in progress on a radio interface to the cells at a point (T1) where the first paging message was transmitted to the RAN node;
      track a progression of 51 MFs in the quarter hyper frame in progress and in subsequent quarter hyper frames using the determined 51-MF;
      calculate a 51 MF at time (T2) when the payload was received for the one of the plurality of wireless devices; and
      calculate the next instance of a paging group for the one of the plurality of wireless devices; and,
      transmit, to at least the RAN node, another paging message associated with the one of the plurality of wireless devices, wherein the another paging message is transmitted a predetermined time before the next instance of the paging group for the one of the plurality of wireless devices.

2. The CN node of claim 1, wherein the CN node is further operable to:
   transmit, to the RAN node, a second paging message associated with a second selected wireless device from the plurality of wireless devices using another eDRX cycle of the plurality of eDRX cycles;
   receive, from the RAN node, a second paging response message which includes a time remaining until a next paging occasion for the second selected wireless device;
   receive a payload for yet another one of the plurality of wireless devices using the another eDRX cycle of the plurality of eDRX cycles; and,
   calculate a time remaining until a next paging occasion for the yet another one of the plurality of wireless devices by utilizing the time remaining until a next paging occasion for the second selected wireless device; and,
   transmit, to at least the RAN node, yet another paging message associated with the yet another one of the plurality of wireless devices, wherein the yet another paging message is transmitted a predetermined time before the next instance of the paging group for the yet another one of the plurality of wireless devices.

3. The CN node of claim 2, wherein the CN node is further operable to repeat the first transmit operation and the first receive operation for additional selected wireless devices using each of the remaining eDRX cycles of the plurality of eDRX cycles, and to repeat the second receive operation, the calculate operation, and the second transmit operation for other ones of the plurality of wireless devices using each of the remaining eDRX cycles of the plurality of eDRX cycles.

4. The CN node of claim 1, wherein the CN node is further operable to perform the calculate operation of the next instance of the paging group for the one of the plurality of wireless devices as follows:
   determine with respect to the time T2 a current value of the tracked 51-MF;
   identify with respect to the time T2 a value of the 51-MF corresponding to the next instance of the paging group for the one of the plurality of wireless devices with respect to the eDRX cycle used by the one of the plurality of wireless devices;

determine a value of the tracked 51-MF that corresponds to the value of the 51-MF identified for the next instance of the paging group for the one of the plurality of wireless devices; and, determine when the value of the tracked 51-MF that corresponds to the value of the 51-MF identified for the next instance of the paging group for the one of the plurality of wireless devices occurs within an allowable range before performing the transmit operation.

5. The CN node of claim 1, wherein the CN node is further operable to track the progression of 51 MFs in the quarter hyper frame in progress and in the subsequent quarter hyper frames by using the determined 51-MF and an internal timer that has a duration equal to 1 51-MF.

6. The CN node of claim 1, wherein the first paging message is a PAGING-Packet Switched (PS) Protocol Data Unit (PDU) or a DUMMY-PAGING-PS PDU.

7. A method in a core network (CN) node configured to interact with a radio access network (RAN) node managing cells in a routing area, the method comprising:

transmitting, to the RAN node, a first paging message associated with a first selected wireless device from a plurality of wireless devices using one Extended Discontinuous Receive (eDRX) cycle of a plurality of eDRX cycles;

receiving, from the RAN node, a first paging response message which includes a time remaining until a next paging occasion for the first selected wireless device;

receiving a payload for one of the plurality of wireless device using the one eDRX cycle of the plurality of eDRX cycles;

calculating a time remaining until a next paging occasion for the one of the plurality of wireless devices by utilizing the time remaining until a next paging occasion for the first selected wireless device, wherein the calculation step further comprises:

determining a 51-multiframe (MF) within a quarter hyper frame in progress on a radio interface to the cells at a point (T1) where the first paging message was transmitted to the RAN node;

tracking a progression of 51 MFs in the quarter hyper frame in progress and in subsequent quarter hyper frames using the determined 51-MF;

calculating a 51 MF at time (T2) when the payload was received for the one of the plurality of wireless devices; and, calculating the next instance of a paging group for the one of the plurality of wireless devices; and, transmitting, to at least the RAN node, another paging message associated with the one of the plurality of wireless devices, wherein the another paging message is transmitted a predetermined time before the next instance of the paging group for the one of the plurality of wireless devices.

8. The method of claim 7, further comprising:

transmitting, to the RAN node, a second paging message associated with a second selected wireless device from the plurality of wireless devices using another eDRX cycle of the plurality of eDRX cycles;

receiving, from the RAN node, a second paging response message which includes a time remaining until a next paging occasion for the second selected wireless device;

receiving a payload for yet another one of the plurality of wireless devices using the another eDRX cycle of the plurality of eDRX cycles; and, calculating a time remaining until a next paging occasion for the yet another one of the plurality of wireless devices by utilizing the time remaining until a next paging occasion for the second selected wireless device; and, transmitting, to at least the RAN node, yet another paging message associated with the yet another one of the plurality of wireless devices, wherein the yet another paging message is transmitted a predetermined time before the next instance of the paging group for the yet another one of the plurality of wireless devices.

9. The method of claim 8, further comprising repeating the first transmitting step and the first receiving step for additional selected wireless devices using each of the remaining eDRX cycles of the plurality of eDRX cycles, and repeating the second receiving step, the calculating step, and the second transmitting step for other ones of the plurality of wireless devices using each of the remaining eDRX cycles of the plurality of eDRX cycles.

10. The method of claim 7, wherein the step of calculating the next instance of the paging group for the one of the plurality of wireless devices further comprises:

determining with respect to the time T2 a current value of the tracked 51-MF;

identifying with respect to the time T2 a value of the 51-MF corresponding to the next instance of the paging group for the one of the plurality of wireless devices with respect to the eDRX cycle used by the one of the plurality of wireless devices;

determining a value of the tracked 51-MF that corresponds to the value of the 51-MF identified for the next instance of the paging group for the one of the plurality of wireless devices; and, determining when the value of the tracked 51-MF that corresponds to the value of the 51-MF identified for the next instance of the paging group for the one of the plurality of wireless devices occurs within an allowable range before performing the transmit operation.

11. The method of claim 7, wherein the step of tracking the progression of 51 MFs in the quarter hyper frame in progress and in the subsequent quarter hyper frames further comprises using the determined 51-MF and an internal timer that has a duration equal to 1 51-MF.

12. The method of claim 7, wherein the first paging message is a PAGING-Packet Switched (PS) Protocol Data Unit (PDU) or a DUMMY-PAGING-PS PDU.

13. The CN node of claim 1, wherein the CN node is operable to perform the transmit the first paging message operation and the receive the first paging response message operation before the receive the payload operation, the calculate operation, and the transmit the another paging message operation.

14. The method of claim 7, wherein the CN node implements the transmitting the first paging message step and the receiving the first paging response message step before the receiving the payload step, the calculating step, and the transmitting the another paging message step.

* * * * *